(12) United States Patent
Duggal et al.

(10) Patent No.: US 11,423,563 B2
(45) Date of Patent: Aug. 23, 2022

(54) DEPTH ESTIMATION FOR AUTONOMOUS DEVICES

(71) Applicant: UATC, LLC, San Francisco, CA (US)

(72) Inventors: Shivam Duggal, Toronto (CA); Shenlong Wang, Toronto (CA); Wei-Chiu Ma, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 302 days.

(21) Appl. No.: 16/826,924

(22) Filed: Mar. 23, 2020

(65) Prior Publication Data
US 2020/0302627 A1 Sep. 24, 2020

Related U.S. Application Data

(60) Provisional application No. 62/971,282, filed on Feb. 7, 2020, provisional application No. 62/822,845, filed on Mar. 23, 2019.

(51) Int. Cl.
*G06T 7/593* (2017.01)
*G06N 20/00* (2019.01)

(52) U.S. Cl.
CPC ............ *G06T 7/593* (2017.01); *G06N 20/00* (2019.01); *G06T 2207/10028* (2013.01); *G06T 2207/20228* (2013.01); *G06T 2207/30252* (2013.01)

(58) Field of Classification Search
CPC ........... G06T 7/593; G06T 2207/10028; G06T 2207/20228; G06T 2207/30252; G06T 2207/20084; G06N 20/00
See application file for complete search history.

(56) References Cited

U.S. PATENT DOCUMENTS 11,062,471 B1 * 7/2021 Zhong ................... G06T 7/593
2018/0255283 A1 * 9/2018 Li ........................ G06K 9/6267

OTHER PUBLICATIONS

Barnard et al., "Computational Stereo", AI Center, SRI International, Technical Note 261, Mar. 1982, 40 pages.
(Continued)

*Primary Examiner* — Edward F Urban
*Assistant Examiner* — Wassim Mahrouka
(74) *Attorney, Agent, or Firm* — Dority & Manning, P.A.

(57) ABSTRACT

Systems, methods, tangible non-transitory computer-readable media, and devices associated with depth estimation are provided. For example, a feature representation associated with stereo images including a first and second plurality of points can be accessed. Sparse disparity estimates associated with disparities between the first and second plurality of points can be determined. The sparse disparity estimates can be based on machine-learned models that estimate disparities based on comparisons of the first plurality of points to the second plurality of points. Confidence ranges associated with the disparities between the first and second plurality of points can be determined based on the sparse disparity estimates and the machine-learned models. A disparity map for the stereo images can be generated based on using the confidence ranges and machine-learned models to prune the disparities outside the confidence ranges. Furthermore, three-dimensional depth estimates associated with the stereo images can be generated based on the disparity map.

20 Claims, 9 Drawing Sheets

(56) References Cited

OTHER PUBLICATIONS

Barnes et al., "PatchMatch: A Randomized Correspondence Algorithm for Structural Image Editing", ACM Transactions on Graphics, vol. 28. No. 3, Aug. 2009, 10 pages.
Barnes et al., "The Generalized PatchMatch Correspondence Algorithm", 11$^{th}$ European Conference on Computer Vision, Sep. 5-11, 2010, Crete, Greece, 14 pages.
Besse et al., "PMBP: PatchMatch Belief Propagation for Correspondence Field Estimation", International Journal of Computer Vision, vol. 110. No. 1. Oct. 2014, 11 pages.
Bleyer et al., "PatchMatch Stereo—Stereo Matching with Slanted Support Windows", The 22$^{nd}$ British Machine Vision Conference (BMVC 2011), Aug. 29-Sep. 2011, 11 pages.
Calonder et al., "BRIEF: Binary Robust Independent Elementary Features", 11$^{th}$ European Conference on Computer Vision, Sep. 5-11, 2010, Crete, Greece, 14 pages.
Cheng et al., "Learning Depth with Convolutional Spatial Propagation Network", arXiv:1810.02695v1, Oct. 4, 2018, 17 pages.
Ferstl, "Image Guided Depth Upsampling using Anisotropic Total Generalized Variation", IEEE International Conference on Computer Vision, Dec. 1-8, 2013, Sydney, Australia, pp. 993-1000.
Geiger et al., "Are we ready for Autonomous Driving? The KITTI Vision Benchmark Suite", IEEE Conference on Computer Vision and Pattern Recognition, Jun. 16-21, 2012. Providence, Rhode Island, 8 pages.
He et al., "Computing Nearest-Neighbor Fields via Propagation-Assisted KD-Trees", IEEE Conference on Computer Vision and Pattern Recognition, Jun. 16-21, 2012, Providence, Rhode Island, 8 pages.
HE et al., "Spatial Pyramid Pooling in Deep Convolutional Networks for Visual Recognition", arXiv:1406.4729v1, Jun. 18, 2014, 11 pages.
Hirschmuller, "Stereo Processing by Semiglobal Matching and Mutual Information", IEEE Transactions on Pattern Analysis and Machine Intelligence, vol. 30, No. 2, Feb. 2008, 14 pages.
Khamis et al., "StereoNet: Guided Hierarchical Refinement for Real-Time Edge-Aware Depth Prediction", arXiv:1807.08865v1, Jul. 24, 2018, 18 pages.
Korman, "Coherency Sensitive Hashing", IEEE Transactions on Pattern Analysis and Machine Intelligence, vol. 38, No. 6, 2016, 15 pages.
Lowe, "Distinctive Image Features from Scale-Invariant Keypoints", International Journal of Computer Vision, vol. 60, No. 2, Nov. 2004, 28 pages.
Lowe, "Object Recognition from Local Scale-Invariant Feature", Proceedings of the Seventh IEEE International Conference on Computer Vision, Sep. 20-25, 1999, Corfu, Greece, 8 pages.
Lu et al., "PatchMatch Filter: Efficient Edge-Aware Filtering Meets Randomized Search for Fast Correspondence Field Estimation", Conference on Computer Vision and Pattern Recognition, Jun. 23-28, 2013, Portland, Oregon, pp. 1854-1861.
Luo el al., "Efficient Deep Learning for Stereo Matching", Conference on Computer Vision and Pattern Recognition, Jun. 26-Jul. 1, 2016, Las Vegas, NV, 9 pages.
Mayer et al., "A Large Dataset to Train Convolutional Networks for Disparity, Optical Flow, and Scene Flow Estimation", arXiv:1512.02164v1, Dec. 7, 2015, 14 pages.
Menze et al., "Object Scene Flow for Autonomous Vehicles", Conference on Computer Vision and Pattern Recognition, Jun. 7-12, 2015, Boston, Massachusetts. 10 pages.
Pang et al., "Cascade Residual Learning: A Two-stage Convolutional Neural Network for Stereo Matching", Workshop on Geometry Meets Deep Learning, Oct. 28, 2016, Venice, Italy, 9 pages.
Scharstein et al., "A Taxonomy and Evaluation of Dense Two-Frame Stereo Correspondence Algorithms", International Journal of Computer Vision, vol. 47, No. 1-3, Apr.-Jun. 2002, pp. 7-42.
Song et al., "EdgeStereo: A Context Integrated Residual Pyramid Network for Stereo Matching", arXiv:1803.05196v3, Sep. 23, 2018, 16 pages.
Szeliski et al., "A Comparative Study of Energy Minimization Methods for Markov Random Fields with Smoothness-Based Priors", IEEE Transactions on Pattern Analysis and Machine Intelligence, vol. 30, No. 6, Jun. 2008, pp. 1068-1080.
Tola et al. "DAISY: An Efficient Dense Descriptor Applied to Wide-Baseline Stereo", IEEE Transactions on Pattern Analysis and Machine Intelligence, vol. 32, No. 5, May 2010, pp. 815-830.
Tonioni et al., "Real-time self-adaptive deep stereo", Conference on Computer Vision and Pattern Recognition, Jun. 16-20, 2019, Long Beach, CA, pp. 195-204.
Tulyakov et al., "Practical Deep Stereo (PDS): Toward applications-friendly deep stereo matching.", Thirty-second Conference on Neural Information Processing Systems, Dec. 3-8, 2018, Montreal, Canada, 11 pages.
Yamaguchi et al., "Efficient Joint Segmentation Occlusion Labeling, Stereo and Flow Estimation", 13$^{th}$ European Conference on Computer Vision (ECCV), Sep. 6-12, 2014, Zurich, Switzerland, 16 pages.
Yang et al., "SegStereo: Exploiting Semantic Information for Disparity Estimation", 15$^{th}$ European Conference on Computer Vision (ECCV). Sep. 8-14, 2018, Munich, Germany, 16 pages.
Yang et al., "Stereo Matching with Color-Weighted Correlation, Hierarchical Belief Propagation and Occlusion Handling", IEEE Transactions on Pattern Analysis and Machine Intelligence, vol. 31, No. 3, 2009, 16 pages.
Yin et al., "Hierarchical Discrete Distribution Decomposition for Match Density Estimation", arXiv: 1812.06264v2, Dec. 29, 2018, 10 pages.
Yoo et al., "Fast Normalized Cross-Correlation", Circuits, Systems and Signal Processing, vol. 28, No. 819, 2009, 8 pages.
Zabih et al., "No-parametric Local Transforms for Computing Visual Correspondence", Third European Conference on Computer Vision (ECCV), May 2-6, 1994, Stockholm, Sweden, 8 pages.
Zagoruyko et al., "Learning to Compare Image Patches via Convolutional Neural Networks", IEEE Conference on Computer Vision and Pattern Recognition, Jun. 7-12, 2015, Boston, MA, pp. 4353-4361.
Zbontar et al., "Stereo Matching by Training a Convolutional Neural Network to Compare Image Patches", Journal of Machine Learning Research, vol. 17, 2016, 32 pages.
Zhao et al., "Pyramid Scene Parsing Network", Conference on Computer Vision and Pattern Recognition, Jul. 21-26, 2017, Honolulu, HI, pp. 2881-2890.
International Search Report and Wtitten Opinion for PCT/US2020/024172, dated Jun. 2, 2020, 14 pages.
Duggal, "DeepPruner: Learning Efficient Stereo Matching via Differentiable PatchMatch", arXiv:1909.05845v1, 10 pages.
Cheng, "Learning to refine depth for robust stereo estimation", Pattern Recognition, vol. 74, Aug. 31, 2017, pp. 122-133.
Choi, "Learning Descriptor. Confidence, and Depth Estimation in Multi-view Stereo", 2018 IEEE/CVF Conference on Computer Vision and Pattern Recognition Workshops, Jun. 18, 2018, 8 pages.
Chang, "Pyramid Stereo Matching Network", arXiv:1803.08669v1, 10 pages.
Kendall, "End-to-End Learning of Geometry and Context for Deep Stereo Regression" arXiv:1703.04309v1, 10 pages.

* cited by examiner

DEPTH ESTIMATION FOR AUTONOMOUS DEVICES

RELATED APPLICATION

The present application is based on and claims benefit of U.S. Provisional Patent Application No. 62/822,845 having a filing date of Mar. 23, 2019; and U.S. Provisional Patent Application No. 62/971,282 having a filing date of Feb. 7, 2020, which are incorporated by reference herein.

FIELD

The present disclosure relates generally to depth estimation of objects depicted in stereo images.

BACKGROUND

Vehicles, including autonomous vehicles, can receive data that is used to determine the state of an environment through which the vehicle travels. This data can be associated with various representations of the environment including objects that are present in the environment. As the state of the environment is dynamic, and the objects that are present in the environment can change over time, operation of a vehicle may rely on an accurate determination of the state of the representations of the environment over time.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of depth estimation. The computer-implemented method can include accessing, by a computing system including one or more computing devices, a feature representation associated with a pair of stereo images including a first plurality of points and a second plurality of points respectively. The computer-implemented method can include determining, by the computing system, sparse disparity estimates associated with disparities between the first plurality of points and the second plurality of points. The sparse disparity estimates can be based at least in part on one or more machine-learned models configured to perform operations including estimating the disparities based at least in part on one or more comparisons of portions of the first plurality of points to portions of the second plurality of points. The computer-implemented method can include determining, by the computing system, based at least in part on the sparse disparity estimates and the one or more machine-learned models, a plurality of confidence ranges associated with the disparities between the portions of the first plurality of points and the portions of the second plurality of points. The computer-implemented method can include generating, by the computing system, a disparity map for the pair of stereo images based at least in part on using the plurality of confidence ranges and the one or more machine-learned model to prune the disparities that are outside of the plurality of confidence ranges. Furthermore, the computer-implemented method can include generating, by the computing system, based at least in part on the disparity map, one or more three-dimensional depth estimates associated with the pair of stereo images.

Another example aspect of the present disclosure is directed to a computing system including: one or more processors; a memory including one or more computer-readable media, the memory storing computer-readable instructions that when executed by the one or more processors cause the one or more processors to perform operations. The operations can include accessing a feature representation associated with a pair of stereo images including a first plurality of points and a second plurality of points respectively. The operations can include determining sparse disparity estimates associated with disparities between the first plurality of points and the second plurality of points. The sparse disparity estimates can be based at least in part on one or more machine-learned models configured to perform operations including estimating the disparities based at least in part on one or more comparisons of portions of the first plurality of points to portions of the second plurality of points. The operations can include determining, based at least in part on the sparse disparity estimates and the one or more machine-learned models, a plurality of confidence ranges associated with the disparities between the portions of the first plurality of points and the portions of the second plurality of points. The operations can include generating a disparity map for the pair of stereo images based at least in part on using the plurality of confidence ranges and the one or more machine-learned models to prune the disparities that are outside of the plurality of confidence ranges. Furthermore, the operations can include generating, based at least in part on the disparity map, one or more three-dimensional depth estimates associated with the pair of stereo images.

Another example aspect of the present disclosure is directed to an autonomous vehicle including: one or more processors; a memory including one or more computer-readable media, the memory storing computer-readable instructions that when executed by the one or more processors cause the one or more processors to perform operations. The operations can include accessing a feature representation associated with a pair of stereo images including a first plurality of points and a second plurality of points respectively. The operations can include determining sparse disparity estimates associated with disparities between the first plurality of points and the second plurality of points. The sparse disparity estimates can be based at least in part on one or more machine-learned models configured to perform operations including estimating the disparities based at least in part on one or more comparisons of portions of the first plurality of points to portions of the second plurality of points. The operations can include determining, based at least in part on the sparse disparity estimates and the one or more machine-learned models, a plurality of confidence ranges associated with the disparities between the portions of the first plurality of points and the portions of the second plurality of points. The operations can include generating a disparity map for the pair of stereo images based at least in part on using the plurality of confidence ranges and the one or more machine-learned models to prune the disparities that are outside of the plurality of confidence ranges. Furthermore, the operations can include generating, based at least in part on the disparity map, one or more three-dimensional depth estimates associated with the pair of stereo images.

Other example aspects of the present disclosure are directed to other systems, methods, vehicles, apparatuses, tangible non-transitory computer-readable media, and devices for depth estimation.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
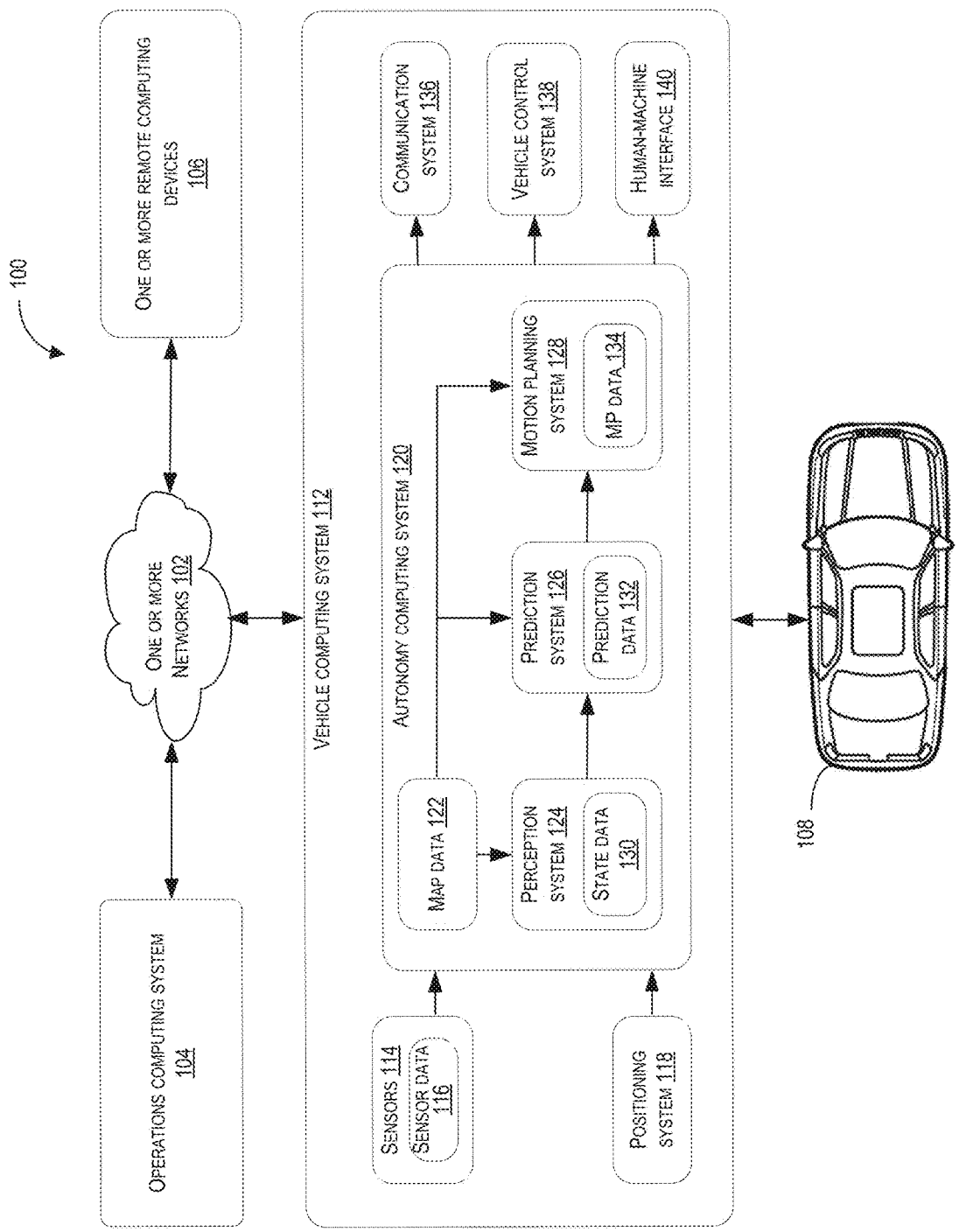
FIG. 1 depicts a diagram of an example system according to example embodiments of the present disclosure.

Example aspects of the present disclosure are directed to estimating the depth of objects in an environment. In particular, the disclosed technology can use information associated with disparities between sets of images to estimate the depth of objects depicted in the images. Furthermore, the disclosed technology can improve the accuracy of depth estimates by using one or more machine-learned models that are configured to generate three-dimensional depth estimates based on comparisons of different portions of stereo image pairs.

By way of example, the depth estimates generated using the disclosed technology can be implemented in a variety of ways, including as an input to the perception system of an autonomous device, such as an autonomous vehicle. By using the depth estimates in this fashion, improved representations of the environment through which an autonomous vehicle travels can be created, thereby resulting in improved vehicle safety and more effective vehicle operation.

The disclosed technology can be implemented as a computing system (e.g., a depth estimation computing system) that is configured to access various data including a feature representation associated with a pair of stereo images. The pair of stereo images can include images from a pair of cameras directed to capture visual information from largely overlapping portions of the same environment. The feature representation can then be used to determine sparse disparity estimates associated with disparities between the pair of stereo images. The sparse disparity estimates can include estimated disparities between the pair of stereo images at corresponding regions of the pair of stereo images. Further, the sparse disparity estimates can be based on visual disparities between the corresponding regions of the pair of stereo images. Furthermore, the depth estimation computing system can use machine-learned models to determine the sparse disparity estimates by estimating the disparities between the pair of stereo images based on comparisons of respective portions of the pair of stereo images. The machine-learned models can also later be used in the determination of confidence ranges and a disparity map for the pair of stereo images. Using the sparse disparity estimates, confidence ranges can be determined for certain portions of the pair of stereo images. Furthermore, a disparity map can be generated based on the confidence ranges. Using the disparity map, the depth estimation computing system can generate one or more three-dimensional dimensional depth estimates that can, in some implementations, be formatted for use in a variety of applications including uses associated with the operation of an autonomous vehicle.

Accordingly, the disclosed technology can increase the accuracy and precision with which depth in images can be estimated. This increase in the accuracy and precision of depth estimation can allow for a significant number of improvements in the operation of autonomous devices and other systems that benefit from better depth estimates.

The depth estimation computing system can access a variety of information/data, which can include a feature representation that can be associated with a pair of stereo images (e.g., images that capture the same environment from different perspectives). The feature representation can be accessed in various ways including accessing data including information associated with the feature representation that is stored on one or more storage devices; and/or receiving, retrieving, and/or obtaining data from one or more sensors and/or computing systems that generate the feature representation. In some embodiments, the feature representation can include sets of stereo images that are captured over one or more time intervals. For example, the feature representation can include a pair of video streams, each video stream including one or more images of the same environment from different perspectives that were captured over one or more time intervals.

In some embodiments, each image of the pair of stereo images can include a plurality of regions or sections, each of which can be located at a different portion of the respective image and can have an associated color and/or brightness level. For example, the pair of stereo images can include a first plurality of points and a second plurality of points respectively. In some embodiments, the first plurality of points and/or the second plurality of points can correspond to a first plurality of pixels and a second plurality of pixels respectively. Further, in some embodiments, each of the first plurality of pixels and/or the second plurality of pixels can be associated with a respective RGB value. In some embodiments, the pair of stereo images can be captured over one or more time intervals. For example, each pair of stereo images can be captured over one or more time intervals.

By way of further example, a first stereo image captured from a camera on the left side of an autonomous vehicle can include the first plurality of points and a second stereo image captured from a camera on the right side of the autonomous vehicle can include the second plurality of points.

In some embodiments, the pair of stereo images can be rectified images and can include overlapping fields of view of an environment such that common portions of the environment are visible in both stereo images. For example, the position of a pair of cameras that respectively capture a pair of stereo images can be horizontally displaced, but not vertically displaced, so that epipolar lines associated with the pair of stereo images will be horizontal.

The depth estimation computing system can determine and/or generate estimates which can include sparse disparity estimates. The sparse disparity estimates can be associated with disparities between different images and/or different portions of images. In some embodiments, the sparse disparity estimates can be associated with any disparities between different images and/or portions of images included in and/or associated with the feature representation including disparities over one or more time intervals. For example, the sparse disparity estimates can be associated with disparities between the first plurality of points and the second plurality of points. In some embodiments, the sparse disparity estimates can be based at least in part on one or more machine-learned models (e.g., the use of the one or more machine-learned models to generate an output including the sparse disparity estimates). Furthermore, the one or more machine-learned models can be configured to perform operations that include estimating the disparities between the first plurality of points and the second plurality of points based at least in part on one or more comparisons of portions of each of the pair of stereo images (e.g., comparing portions of the first plurality of points to portions of the second plurality of points). For example, the one or more machine-learned models can be configured to receive input including the pair of stereo images and/or the first plurality of points and the second plurality of points and generate output including the sparse disparity estimates based at least in part on the input.

In some embodiments, the one or more comparisons of the portions of the pair of stereo images to one another (e.g., comparisons of the portions of the first plurality of points to the portions of the second plurality of points) can include use of a one-hot filter pattern on the portions of the pair of stereo images (e.g., applying the one-hot filter pattern to the portions of the first plurality of points and the portions of the second plurality of points).

In some embodiments, the determination of the sparse disparity estimates can include determining the portions of the first plurality of points to compare against the portions of the second plurality of points. Further, the determination of the portions of the first plurality of points to compare against the second plurality of points can be based at least in part on a random sampling of the first plurality of points. For example, the portions of the first plurality of points can include clusters of points that are randomly sampled from different locations of the first plurality of points. Further, the locations of the portions of the second plurality of points can correspond to the randomly sampled locations of the portions of the first plurality of points. For example, the portions of the second plurality of points can include the same number of points in the same relative location as the portions of the first plurality of points that were randomly sampled.

In some embodiments, the random sampling of the first plurality of points can be based at least in part on a variety of distributions including a random sampling of a uniform distribution of the first plurality of points.

In some embodiments, the determination of the sparse disparity estimates can include determining a plurality of disparities between the portions of the first plurality of points and the portions of the second plurality of points. The plurality of disparities that is determined can be based at least in part on the one or more comparisons of the portions of the first plurality of points to the portions of the second plurality of points. For example, portions of the first plurality of points located at a location in the first plurality of points can be compared to the portions of the second plurality of points that are located at the same relative location in the second plurality of points. The one or more comparisons can be used to determine the disparity in visual appearance between the portion of the first plurality of points and the portion of the second plurality of points.

In some embodiments, the determination of the sparse disparity estimates can include the use of matching scores. Further, determining the sparse disparity estimates can be based at least in part on matching scores associated with the plurality of disparities between the portions of the first plurality of points and the portions of the second plurality of points. In some embodiments, the matching scores can be based at least in part on one or more disparity operations that are performed by one or more layers of the one or more machine-learned models. The one or more disparity operations can include generating the matching scores based on disparities between the portions of the first plurality of points and the portions of the second plurality of points. In some embodiments, the matching score can be inversely correlated with the amount of disparity between the portions of the first plurality of points and the portions of the second plurality of points (e.g., the matching score is high when the amount of disparity is low, and the matching score is low when the amount of disparity is high). The sparse disparity estimates can then be based at least in part on the highest matching scores that indicate the least amount of disparity between the portions of the first plurality of points and the portions of the second plurality of points.

The depth estimation computing system can determine a plurality of confidence ranges. The determination of the plurality of confidence ranges can be based at least in part on the sparse disparity estimates and the one or more machine-learned models. For example, the one or more machine-learned models can be configured to generate output including the plurality of confidence ranges based at least in part on input including the sparse disparity estimates. Further, the plurality of confidence ranges can be associated with (e.g., correspond to) the disparities between portions of the first plurality of points and portions of the second plurality of points. For example, each point of the first plurality of points can be associated with a corresponding confidence range. In some embodiments, each of the plurality of confidence ranges can include confidence values associated with one or more disparities between the portions of the first plurality of points and the portions of the second plurality of points.

In some embodiments, the each confidence range $\mathcal{R}_i$ of the plurality of confidence ranges can be expressed as $\mathcal{R}_i = [l_i, u_i]$ for each point i. The terms $l_i$ and $u_i$ can represent the lower bound of the confidence range and the upper bound of the confidence range respectively.

In some embodiments, determining the plurality of confidence ranges can include generating a warped second plurality of points based at least in part on the sparse disparity estimates and the second plurality of points. For example, the sparse disparity estimates can be applied to the second plurality of points to generate a warped second plurality of points.

In some embodiments, determining the plurality of confidence ranges can be based at least in part on the one or more machine-learned models including a machine-learned confidence prediction model configured to determine the plurality of confidence ranges based at least in part on an input including the first plurality of points, the warped plurality of points, and the sparse disparity estimates.

The depth estimation computing system can generate a disparity map for the pair of stereo images based at least in part on using the plurality of confidence ranges and the one or more machine-learned models to prune the disparities that are outside of the plurality of confidence ranges. For example, the one or more machine-learned models can be configured to generate output including the disparity map based at least in part on input including the plurality of confidence ranges. The disparity map can include depth information including the disparity between each point in the first plurality of points and the corresponding point in the second plurality of points.

The depth estimation computing system can generate, based at least in part on the disparity map, one or more three-dimensional depth estimates associated with the pair of stereo images. For example, the disparity map can be used to generate three-dimensional estimates of the physical location of each portion of the environment depicted by each point in the disparity map.

In some embodiments, the one or more three-dimensional depth estimates can be used as part of an input to a perception system of the autonomous vehicle. For example, the one or more three-dimensional depth estimates can be formatted to be accepted as an input to a perception system of an autonomous vehicle. The perception system can be configured to receive the one or more three-dimensional estimates in order to generate information associated with the location of objects for use by various autonomy systems (e.g., prediction systems and/or motion planning systems) of the autonomous vehicle.

In some embodiments, the sparse disparity estimates can be determined over a plurality of iterations. Furthermore, each of the plurality of iterations can include one or more disparity operations associated with determination of the portions of the first plurality of points that have minimal disparity with respect to the portions of the second plurality of points. For example, the comparisons of portions of the first plurality of points to portions of the second plurality of points can be performed over a plurality of iterations, with each iteration including a determination of the points associated with the lowest disparity (e.g., the highest matching score) that are then used in the next iteration.

In some embodiments, at least one of the one or more machine-learned models can include a plurality of layers. The plurality of layers can be configured to perform operations including the one or more comparisons of the portions of the first plurality of points and the portions of the second plurality of points. Further, the plurality of layers can include a sampling layer, a propagation layer, and/or an evaluation layer.

In some embodiments, the soft arg max associated with the disparity ($\hat{d}_i$) can be expressed as $$\hat{d}_i = \frac{\sum_j s_{i,j} \cdot d_{i,j}}{\sum_j s_{i,j}}.$$

The disparity $d_i$ can be maximized between a feature map s (e.g., a feature map associated with the stereo image associated with the first plurality of points) and a feature map d (e.g., a feature map associated with the stereo image associated with the second plurality of points) for each point (e.g., pixel) of the first plurality of points i and all candidates j (e.g., a corresponding point on the second plurality of points).

In some embodiments, the one or more machine-learned models can include at least one end-to-end differentiable machine-learned model. For example, the one or more machine-learned models can include a pipeline with a set of machine-learned models (e.g., four machine-learned models) that sequentially perform different operations associated with generating depth estimates. The first machine-learned model in the pipeline (e.g., a feature extraction model) can receive an input (e.g., a feature representation) and generate an output that is provided as an input to a second machine-learned model (e.g., a confidence range prediction model) that generates an output that is provided an input to a third machine-learned model (e.g., disparity map generation model) that generates an output that is in turn provided as an input to the fourth and last model (e.g., a refinement model) in the pipeline that generates an output.

Training the machine-learned models can include training the machine-learned models in the pipeline end-to-end (e.g., from the first machine-learned model in the pipeline to the last machine-learned model in the pipeline). Further, constituent components (e.g., functions of the machine-learned models) of the machine-learned models can be differentiable and backpropagation can be used as part of training the machine-learned models in the pipeline from end-to-end.

In some embodiments, the one or more machine-learned models can be trained based at least in part on minimization of a loss associated with one or more disparities between a training disparity map and a ground-truth disparity map. For example, the one or more machine-learned models can be trained using a loss function that is evaluated to determine the loss based at least in part on the one or more disparities at each point of the training disparity map relative to the corresponding point of the ground-truth disparity map.

In some embodiments, a total loss function can be defined as: $(y_{cost}-y_{gt})+l_s(y_{refine}-y_{gt})+\gamma\{l_{lower}(1-y_{gt})+l_{upper}(u-y_{gt})$, in which the total loss is based at least in part on: the difference between the cost disparity (y) and the ground-truth disparity ($y_{cost}-y_{gt}$); the smooth loss associated with the difference between the refinement disparity and the ground-truth refinement disparity ($y_{refine}-y_{gt}$); the balancing scalar $\gamma$; and the difference between the lower bound ($l_{lower}$) and the upper bound ($l_{upper}$) of the confidence range.

In some embodiments, the smooth loss can be defined as:

$$\ell_s(x) = \begin{cases} 0.5x^2, & \text{if } |x| < 1 \\ |x| - 0.5, & \text{otherwise} \end{cases}$$

In some embodiments, the smooth loss associated with the lower bound of the confidence range can be defined as:

$$\ell_{lower}(x) = \begin{cases} (1-\lambda)\ell_s(x), & \text{if } x > 0 \\ \lambda\ell_s(x), & \text{otherwise} \end{cases}$$

In some embodiments, the smooth loss associated with the lower bound of the confidence range can be defined as:

$$\ell_{upper}(x) = \begin{cases} \lambda\ell_s(x), & \text{if } x > 0 \\ (1-\lambda)\ell_s(x), & \text{otherwise} \end{cases}$$

The training disparity map can be generated based at least in part on training data and the one or more machine-learned models. Further, the training data can include a plurality of training feature representations respectively associated with a plurality of pairs of training stereo images. For example, the training disparity map can be generated based at least in part on providing an input including the plurality of training feature representations into one or more machine-learned models configured and/or trained to generate the training disparity map based at least in part on the input.

In some embodiments, the loss can be based at least in part on a loss function associated with a cost aggregated disparity loss and/or a refined disparity loss. In some embodiments, the loss can be positively correlated with one or more disparities between the training disparity map and the ground-truth disparity map.

In some embodiments, generating a disparity map for the pair of stereo images can include determining one or more refined disparity predictions based at least in part on the sparse disparity estimates, the first plurality of points, and the one or more machine-learned models including a machine-learned refinement model configured to analyze low-level features of the feature representation. For example, the machine-learned refinement model can be configured and/or trained to analyze relatively smaller features that can occur at sharp boundaries between objects depicted in the pair of stereo images and can generate one or more refined disparity predictions that can be used to refine the disparity map.

In some embodiments, generating the disparity map for the pair of stereo images can be based at least in part on the one or more refined disparity predictions. For example, the one or more refined disparity predictions can be used to generate a disparity map that is more refined (e.g., more accurately describes the disparity between the first plurality of points and the second plurality of points).

In some embodiments, one or more vehicle systems of an autonomous device (e.g., an autonomous vehicle) can be controlled based at least in part on the one or more three-dimensional depth estimates. An autonomous device can generate one or more signals associated with the one or more three-dimensional depth estimates that are then sent to various vehicle systems and/or vehicle components. The one or more signals associated with the one or more three-dimensional depth estimates can be used to control, operate, and/or activate the vehicle systems and/or vehicle components. For example, a perception system of an autonomous vehicle can use the one or more three-dimensional depth estimates to determine the location of objects relative to the autonomous vehicle. The location of the objects can then be used to control the steering and engine systems of the autonomous vehicle in order to navigate around the objects.

The disclosed technology can be implemented by a variety of systems that estimate the depth of objects relative to some point of reference based on analysis of stereo images of those objects in an environment. In particular, the disclosed technology can be used as part of a vehicle (e.g., an autonomous vehicle) that more accurately estimates the depth of objects, and in turn initiates an appropriate response based on the estimated depth. For example, an autonomous vehicle that accurately estimates the relative depth of objects including pedestrians and other vehicles can navigate the environment with a greater level of safety. Further, more effective depth estimation can result in a smoother ride and greater passenger comfort.

Furthermore, the disclosed technology can include a computing system that is configured to perform various operations associated with estimating the depth of objects in an environment. In some embodiments, the computing system can be associated with the autonomy system of an autonomous vehicle that can include a perception system, a prediction system, and/or a motion planning system. Furthermore, the computing system can process, generate, modify, and/or access (e.g., send, and/or receive) data and/or information including data and/or information associated with estimating the depth of objects and/or control of the autonomy system of the autonomous vehicle. By way of example, in a busy environment filled with a variety of objects (e.g., vehicles, cyclists, and pedestrians), the computing system can use images generated by a set of cameras on an autonomous vehicle to determine the depth of the objects. The depth estimation computing system can then generate control signals that are used to control various vehicle systems (e.g., sensors, autonomy system, and/or vehicle motion control systems) so that the vehicle can perform actions based on the depth estimates. The disclosed technology can also be implemented in other computing system, including robotic computing systems and/or other technology utilizing image data from its environment (e.g., to help plan and perform actions).

The systems, methods, devices, and non-transitory computer-readable media in the disclosed technology can provide a variety of technical effects and benefits including improving the accuracy of depth estimation in general and improving the overall operation of a vehicle that uses information associated with depth estimates in particular. By more effectively estimating the depth of objects through use of one or more machine-learned models, the disclosed technology can provide various benefits including more accurate depth estimation, improvement in the utilization of computational resources, improved scalability, reduced wear and tear on a vehicle, greater fuel efficiency, and improved safety.

The disclosed technology can achieve more accurate and/or precise depth estimation by leveraging the use of one or more machine-learned models that are trained to more effectively estimate depth. The one or more machine-learned models can be trained to estimate depth based on inputs including a set of stereo images. Further, the trained machine-learned models can be optimized to perform the task of estimating depth more efficiently. The disclosed technology can more effectively utilize computational resources by reducing the number of operations that need to be performed to use stereo images to estimate the depth of objects in an environment. In this way, the disclosed technology reduces the amount of time, energy, and computational resources that are used to estimate depth based on images.

Furthermore, by using the one or more machine-learned models, the disclosed technology has the additional advantage of being highly scalable. In particular, a machine-learned model that can be retrained using an additional set of training data can be improved without the laborious manual derivations and adjustments often required by rules-based models and/or heuristic models that do not use machine-learning. For example, in a manually derived rules based model, a human designer may manually derive heuristic models that determine the way in which depth is estimated by manually weighting parameters associated with various aspects of input images. As such, the task of crafting and adjusting a heuristic model can be onerous relative to using a machine-learned model that is trained using training datasets. Further, the one or more machine-learned models in the disclosed technology can be trained using relevant training data including stereo images, which can be done on a large scale that can use millions of images. Additionally, the one or more machine-learned models can be readily revised as new training data becomes available or new uses for the one or more machine-learned models are conceived.

The disclosed technology can also improve the operation of a vehicle by reducing the amount of wear and tear on vehicle components through more gradual adjustments in the vehicle's travel path that can be performed based on the more accurate depth estimation of objects in the environment surrounding the vehicle. For example, more accurate depth estimation can result in a smoother ride with improved safety and a reduction in sudden stops and sharp turns that impose undue strain on a vehicle's engine, braking, and steering systems. Additionally, more accurate depth estimation has the added benefit of improving the comfort of passengers when the vehicle is in transit due to smoother adjustments by the vehicle that result from more accurate depth estimation.

The disclosed technology can further improve the operation of a vehicle by improving the energy efficiency of the vehicle. For example, more accurate depth estimation can result in more efficient navigation of a vehicle through an environment, thereby reducing the number of fuel consuming course changes and achieving a reduction in the overall amount of energy including the fuel or battery power consumed during operation of the vehicle.

Additionally, more effective depth estimation can allow for an improvement in safety for passengers inside a vehicle as well as individuals outside the vehicle including pedestrians, cyclists, and/or passengers of other vehicles. For example, the more accurate depth estimation achieved by the disclosed technology can be used by an autonomous vehicle's perception system to more effectively determine the location of objects and avoid unintentional contact with those objects.

The disclosed technology can provide a host of improvements including greater accuracy in the specific task of estimating the depth of objects and an increase in the overall effectiveness of devices (e.g., autonomous vehicles and/or perception systems) that benefit from improved depth estimation. Accordingly, the improvements offered by the disclosed technology result in tangible benefits to a variety of systems including the mechanical, electronic, and computing systems of autonomous devices.

With reference now to FIGS. 1-10, example embodiments of the present disclosure will be discussed in further detail.

FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more services to a plurality of users via a fleet of vehicles that can include, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform one or more operations and/or functions including any of the operations and/or functions of the one or more remote computing devices 106 and/or the vehicle computing system 112. Furthermore, the operations computing system 104 can perform one or more operations and/or functions including operations associated with accessing a feature representation associated with a pair of stereo images including a first plurality of points and a second plurality of points respectively; determining sparse disparity estimates associated with disparities between the first plurality of points and the second plurality of points; determining, based at least in part on the sparse disparity estimates and the one or more machine-learned models, a plurality of confidence ranges associated with the disparities between the portions of the first plurality of points and the portions of the second plurality of points; generating a disparity map for the pair of stereo images based at least in part on using the plurality of confidence ranges and the one or more machine-learned models to prune the disparities that are outside of the plurality of confidence ranges; and generating, based at least in part on the disparity map, one or more three-dimensional depth estimates associated with the pair of stereo images.

Furthermore, the one or more memory devices of the operations computing system 104 can store data including instructions used to implement one or more machine-learned models that have been configured and/or trained to generate an output based at least in part on an input provided to the one or more machine-learned models. For example, the one or more machine-learned models stored in the one or more memory devices of the operations computing system 104 can include one or more convolutional neural networks, one or more residual convolutional neural networks, one or more recurrent neural networks, and/or one or more recursive neural networks. Further, the one or more machine-learned models stored in the one or more memory devices of the operations computing system 104 can include one or more machine-learned models, that are described herein.

Furthermore, the operations computing system 104 can be configured to monitor and communicate with the vehicle 108 and/or its users to coordinate a vehicle service provided by the vehicle 108. To do so, the operations computing system 104 can manage a database that includes data including state data associated with the state of one or more objects including one or more objects external to the vehicle 108. The state data can include a location of an object (e.g., a latitude, longitude, and/or altitude of an object detected by the one or more sensors 114 of the vehicle 108), the state of a vehicle (e.g., the velocity, acceleration, heading, position, and/or location of the vehicle 108), and/or the state of objects external to a vehicle (e.g., the physical dimensions, velocity, acceleration, heading, shape, sound, and/or appearance of objects external to the vehicle). In some embodiments, the state data can include one or more portions of the sensor data that is described herein.

The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. Furthermore, the one or more memory devices of the one or more remote computing devices 106 can be used to store data including the sensor data, the training data, and/or the one or more machine-learned models that are stored in the operations computing system 104.

The one or more remote computing devices 106 can communicate (e.g., send and/or receive data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude, longitude, and/or altitude), a velocity, an acceleration, a trajectory, and/or a path of the vehicle 108 based in part on signals or data exchanged with the vehicle 108. In some implementations, the operations computing system 104 can include some of the one or more remote computing devices 106.

The vehicle 108 can be a ground-based vehicle (e.g., an automobile, a motorcycle, a train, a tram, a truck, a tracked vehicle, a light electric vehicle, a moped, a scooter, and/or an electric bicycle), an aircraft (e.g., aircraft including a fixed-wing airplane, a helicopter, a vertical take-off and landing (VTOL) aircraft, short take-off and landing (STOL) aircraft, and/or a tiltrotor aircraft), a boat, a submersible vehicle (e.g., a submarine), an amphibious vehicle, a hovercraft, a robotic device (e.g. a bipedal, wheeled, or quadrupedal robotic device), and/or any other type of vehicle. Further, the vehicle 108 can include a vehicle that can be towed, pushed, and/or carried by another vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a manually operated mode (e.g., driven by a human driver), a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, sound, color, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, heading, location, sound, color, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions including any of the one or more operations and/or functions performed by the operations computing system 104 and/or the one or more remote computing devices 106. Further, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including accessing a feature representation associated with a pair of stereo images including a first plurality of points and a second plurality of points respectively; determining sparse disparity estimates associated with disparities between the first plurality of points and the second plurality of points; determining, based at least in part on the sparse disparity estimates and the one or more machine-learned models, a plurality of confidence ranges associated with the disparities between the portions of the first plurality of points and the portions of the second plurality of points; generating a disparity map for the pair of stereo images based at least in part on using the plurality of confidence ranges and the one or more machine-learned models to prune the disparities that are outside of the plurality of confidence ranges; and generating, based at least in part on the disparity map, one or more three-dimensional depth estimates associated with the pair of stereo images. Furthermore, the one or more memory devices of the vehicle computing system 112 can be used to store data including the sensor data, the training data, and/or the one or more machine-learned models that are stored in the operations computing system 104.

Furthermore, the vehicle computing system 112 can perform one or more operations associated with the control, exchange of data, and/or operation of various devices and systems including vehicles, robotic devices, augmented reality devices, and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more microphones (e.g., a microphone array including a plurality of microphones), one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sound data, sonar data, and/or other data acquired by the one or more sensors 114. The one or more objects detected by the one or more sensors 114 can include, for example, pedestrians, cyclists, vehicles, bicycles, buildings, roads, sidewalks, trees, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, the sensor data 116 can be indicative of one or more motion features and/or appearance features associated with one or more objects in an environment detected by the one or more sensors 114 including a LiDAR device and/or camera. By way of further example, the sensor data 116 can be indicative of a LiDAR point cloud and/or images (e.g., raster images) associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and determining the state of its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to determine the state of the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan. One or more of the perception system 124, the prediction system 126, and/or the motion planning system 128 can be included in the same system and/or share at least some computational resources (e.g., processors, memory, etc.).

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class, vehicle class, or bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat or front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 relative to one or more objects detected by the one or more sensors 114 including one or more radar devices. By way of further example, the autonomy computing system 120 can provide one or more outputs including a graphical display of the location of the vehicle 108 on a map of a geographical area within one kilometer of the vehicle 108, including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
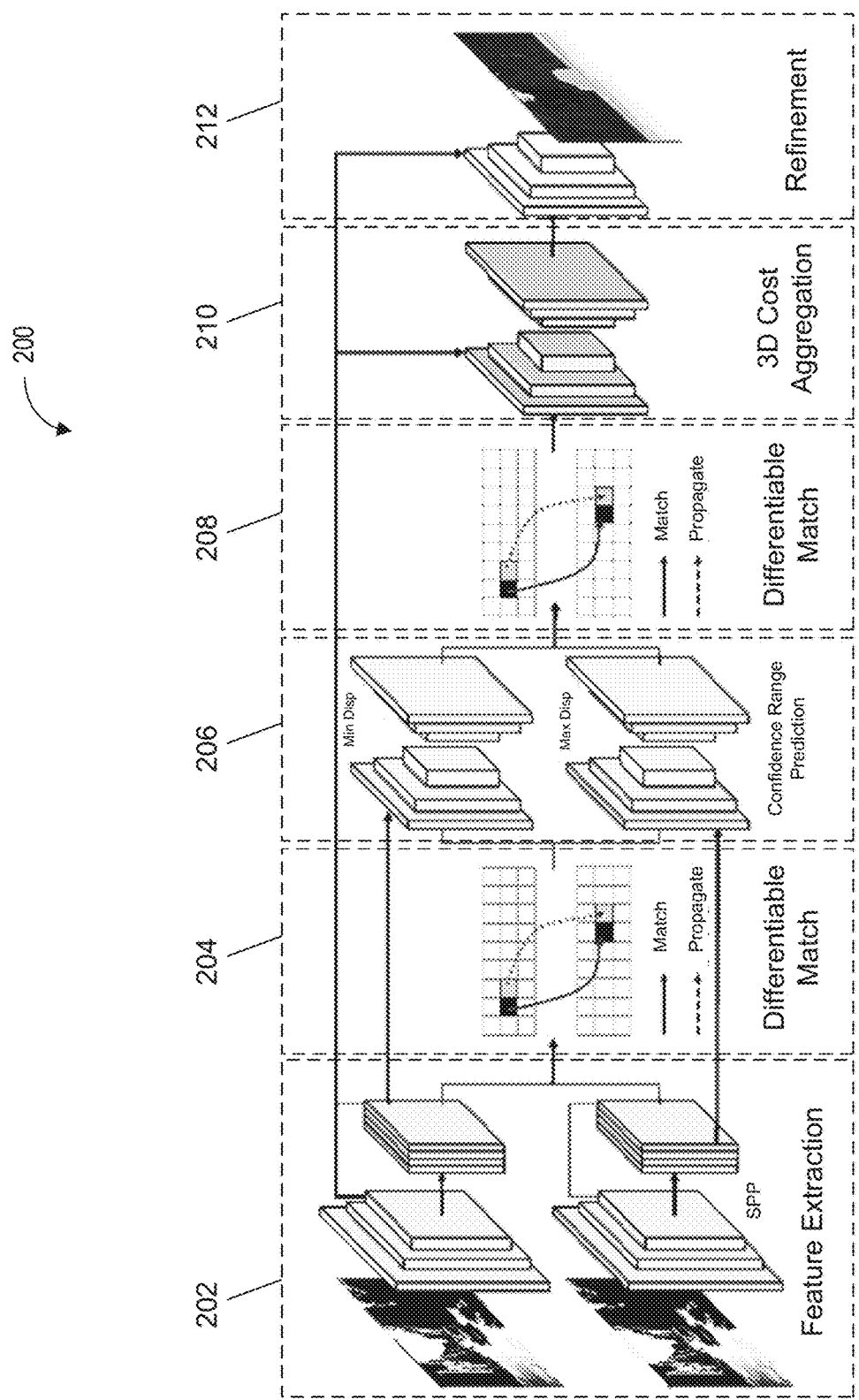
FIG. 2 depicts an example of a stereo depth estimation technique according to example embodiments of the present disclosure.

FIG. 2 depicts an example of a stereo depth estimation technique according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 2 can include one or more features, attributes, and/or capabilities of one or more devices and/or systems including, for example, the operations computing system 104, the vehicle 108, or the vehicle computing system 112, which are depicted in FIG. 1.

As illustrated, FIG. 2 shows an example of a stereo depth estimation technique 200 including feature extraction operations 202, differentiable matching operations 204, confidence range prediction operations 206, differentiable matching operations 208, cost aggregation operations 210, and refinement operations 212.

The feature extraction operations 202 can include receiving an input including a pair of stereo images (e.g., a pair of stereo images represented as $\{x_0, x_1\}$). The pair of stereo images can be used to learn a set of deep features $f_0$, $f_1$ that can be useful for matching. Further, the feature extraction operations 202 can include using one or more machine-learned models (e.g., one or more two-dimensional convolutional neural networks with a spatial pyramid pooling module as a backbone) to learn a set of deep features of any of the pair of stereo images. In some embodiments, four residual blocks and an ×2 dilated convolution for the last block can be used to enlarge the receptive field.

In some embodiments, the input can include sets of stereo images. For example, the multiple sets of stereo images can include a first set of stereo images including one or more images captured over one or more time intervals; and a second set of stereo images including one or more images captured from a different perspective over one or more time intervals. By way of further example, the input can be based at least in part on video streams, each video stream including a respective sequence of images that are captured over one or more time intervals.

The feature extraction operations 202 can also include application of spatial pyramid pooling to build a four level pyramid feature. Through use of multi-scale information, the one or more machine-learned models can be used to capture large context while maintaining a high spatial resolution. The size of the final feature map generated as part of the feature extraction operations 202 can be smaller than the original input image size (e.g., one quarter of the original input image size). The feature extraction operations 202 offer the advantages of a reliable feature representation for each point (e.g., pixel) of the pair of stereo images and/or the sets of stereo images captured over one or more time intervals.

In some embodiments, one or more parameters of the one or more machine-learned models associated with the different stereo images (e.g., a left perspective image and a right perspective image) can be shared.

The differentiable matching operations 204/208 can include implementation of a matching algorithm as part of operations performed by one or more machine-learned models (e.g., a recurrent neural network), in which the operations performed by the one or more machine-learned models are associated with respective iterations of the matching algorithm. The differentiable matching operations 204/208 can include the generation of output including sparse disparity estimates associated with disparities between the pair of stereo images. In some embodiments, the one or more machine-learned models that perform the differentiable matching operations 204/208 can be trained end-to-end.

The one or more machine-learned models used as part of the differentiable matching operations 204/208 can include a plurality of layers including a particle sampling layer, a propagation layer, and/or an evaluation layer. The plurality of layers can be arranged so that the particle sampling layer is before the propagation layer and the evaluation layer, and the propagation layer is before the evaluation layer. The operations performed by the particle sampling layer can include, for each pixel i, randomly generating k disparity values from the uniform distribution over a predicted or pre-defined search space. The operations performed by the propagation layer can include propagating particles from adjacent pixels together through convolution with a pre-defined one-hot filter pattern (see FIG. 4), which encodes the state of allowing each pixel to propagate particles to its 4-neighbours. The operations performed by the evaluation layer can include, for each pixel i, determining or generating matching scores by taking the inner product between the left feature and the right feature: $s_{i,j}=\langle f_0(i), f_1(i+d_{i,j})\rangle$ for all candidates j. The k disparity value for each pixel that satisfies some criteria (e.g., the lowest disparity) is carried towards the next iteration.

In some embodiments, the one or more machine-learned models can include use of one particle sampling layer at the bottom and iteration through the propagation and evaluation layers recurrently. In some embodiments, the arg max operator used during evaluation is not differentiable and can be replaced with a soft arg max version. The soft arg max associated with the disparity ($\hat{d}_i$) can be expressed as $$\hat{d}_i = \frac{\sum_j s_{i,j} \cdot d_{i,j}}{\sum_j s_{i,j}}.$$

The disparity $d_i$ can be maximized between a feature map s (e.g., the feature map for the stereo image $x_0$ generated as part of the feature extraction operations 202) and a feature map d (e.g., (e.g., the feature map for the stereo image $x_j$ generated as part of the feature extraction operations 202) for each point of the plurality of points i associated with the stereo image $x_0$ and all candidates j (e.g., a corresponding point of the plurality of points associated with the stereo image $x_1$).

In some embodiments, the differentiable matching operations 208 are optional and can be selectively performed on images that exceed a predetermined size threshold (e.g., images that include greater than a predetermined threshold number of pixels).

The confidence range prediction operations 206 can include using a subset of the sparse disparity estimates generated as part of the differentiable matching operations 204/208 to predict a confidence range for the actual disparity. The confidence range prediction operations 206 can include the use of one or more machine-learned models (e.g., one or more confidence range prediction networks) that can adjust the search space for each pixel. In some embodiments, the one or more machine-learned models can be configured in a convolutional encoder-decoder structure.

The one or more machine-learned models used as part of the confidence range prediction operations 206 can be configured and/or trained to receive input including the sparse disparity estimations generated as part of the differentiable matching operations 204/208, the left image (e.g., the left perspective image of the pair of stereo images), and a warped right image (e.g., a right perspective image of the pair of stereo images that is warped based at least in part on the sparse disparity estimations). The one or more machine-learned models can perform one or more operations associated with analyzing the features of the input; and generate an output including a confidence range $\mathcal{R}_i = [l_i, u_i]$ for each pixel I ($l_i$ can represent the lower boundary of the confidence range and $u_i$ can represent the upper boundary of the confidence range). The confidence range can prune out the space of unlikely matches, allowing the expensive cost-volume construction and aggregation to happen at a few disparity values.

The cost aggregation operations 210 can be based at least in part on the confidence range determined as part of the confidence range prediction operations 206. Further, the cost aggregation operations 210 can include three-dimensional cost volume estimation and spatial aggregation. The cost aggregation operations 210 can include the use of one or more machine-learned models (e.g., one or more cost aggregation models). The one or more machine-learned models used as part of the cost aggregation operations 210 can be configured and/or trained to receive input including the left image, the warped right image, and/or corresponding disparities; and generating output including the cost over the disparity range at the size B×R×H×W, in which B represents the matching window feature size, R represents the number of disparities per pixel, H represents the height of an image, and W represents the width of an image. In some embodiments, soft argmax can be used to predict the disparity value y cost.

The refinement operations 212 can include use of one or more machine-learned models (e.g., one or more machine-learned convolutional refinement models) to further improve the accuracy of the disparity map that is generated. The one or more machine-learned models can be configured and/or trained to receive input including a current disparity estimation $y_{cost}$ and left image (e.g., the left perspective image of the pair of stereo images) convolutional features from the one or more machine-learned models used in the feature extraction operations 202. The one or more machine-learned models can then output the finetuned disparity prediction $y_{refine}$. The low-level feature information can be used as guidance to reduce noise and improve the quality of the final disparity map. For example, the refinement operations 212 can improve the quality of the disparity map in regions of an image that include sharp boundaries.

Figure 3:
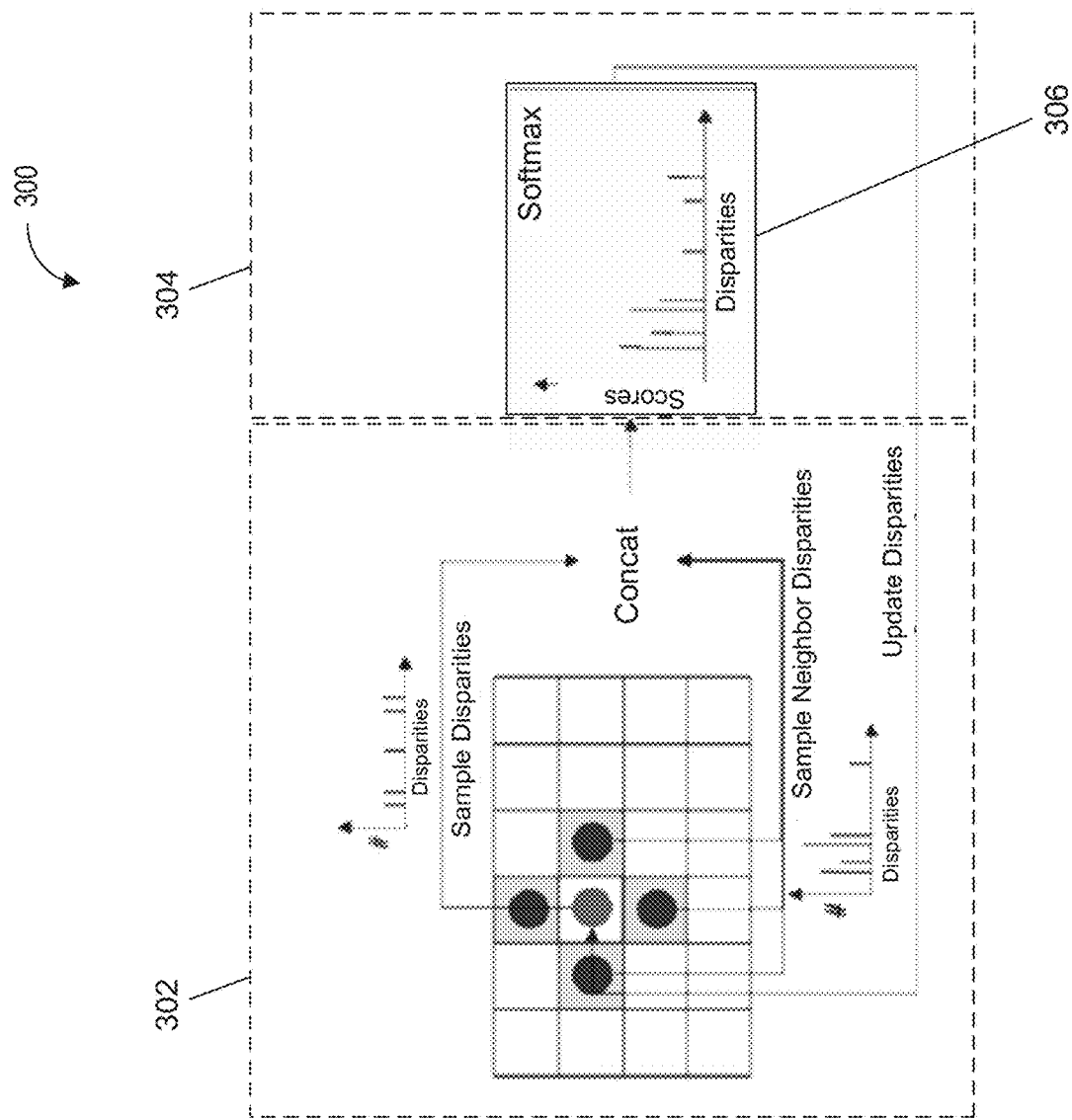
FIG. 3 depicts an example of disparity estimation operations according to example embodiments of the present disclosure.

FIG. 3 depicts an example of disparity estimation operations according to example embodiments of the present disclosure. One or more operations and/or functions in FIG. 3 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows an example of disparity estimation operations 300 including concatenation operations 302, softmax operations 304, and a graph 306.

The concatenation operations 302 can include one or more operations (e.g., recurrent operations of a plurality of operations performed by one or more machine-learned models), that combine propagation and/or evaluation of particles (e.g., points or pixels of a feature representation including a pair of stereo images). Further, the concatenation operations 302 can include dividing the search space (e.g., a plurality of points of an image) into k intervals and determining that the i-th particle will be in an i-th interval. Doing so improves the diversity of the particles and can improve the accuracy of subsequent computations. The concatenation operations 302 can be differentiable, which allows for direct back-propagation through unrolling steps and training of the one or more machine-learned models in an end-to-end manner.

The softmax operations 304 can include the use of a softmax function to generate a probability distribution with scores associated with disparities between the pair of stereo images. As shown in FIG. 3, the softmax operations 304 depict matching scores associated with the pair of stereo images on the y axis of the graph 306 and the disparities between the pair of stereo images on the x axis of the graph 306.

Figure 4:
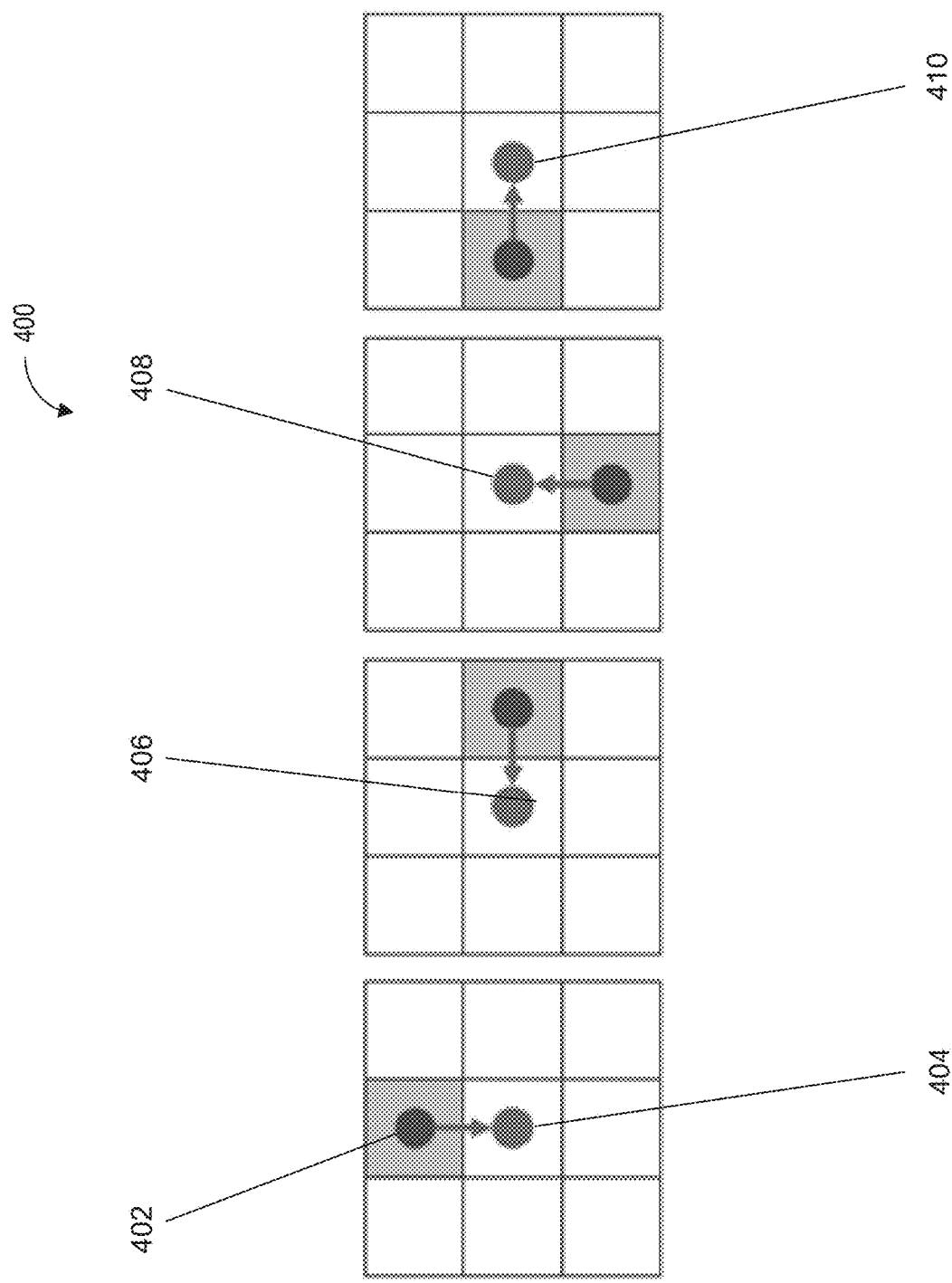
FIG. 4 depicts an example of a one-hot filter pattern according to example embodiments of the present disclosure.

FIG. 4 depicts an example of a one-hot filter pattern according to example embodiments of the present disclosure. One or more operations and/or functions in FIG. 4 can be implemented and/or performed by one or more devices (e.g., one or more computing devices) and/or systems including, for example, the operations computing system 104, the vehicle 108, or the vehicle computing system 112, which are depicted in FIG. 1.

As illustrated, FIG. 4 shows an example of a one-hot filter pattern operations 400 that includes a candidate pixel 402, a neighboring pixel 404, a neighboring pixel 406, a neighboring pixel 408, and a neighboring pixel 410.

The one-hot filter pattern operations 400 can be used as part of the differentiable matching operations 204/208 that are illustrated in FIG. 2. The candidate pixel 402 can be a pixel that is randomly selected from a plurality of pixels in an image (e.g., either a left image or a right image of a pair of stereo images). The one-hot filter pattern operations 400 can include determination and/or selection of a plurality of neighboring pixels that are adjacent to the candidate pixel

402. In this example, the candidate pixel 402 is adjacent to the neighboring pixel 404 (below the candidate pixel 402), the neighboring pixel 406 (to the left of the candidate pixel 402), the neighboring pixel 408 (above the candidate pixel 402), and the neighboring pixel 410 (to the right of the candidate pixel 402). In some embodiments, the plurality of pixels including the neighboring pixel 404, the neighboring pixel 406, the neighboring pixel 408, and the neighboring pixel 410 can be propagated together through convolution using one or more machine-learned models and a predefined one-hot filter pattern (e.g., the pixels immediately above, below, to the right, and to the left of the candidate pixel are propagated).

Figure 5:
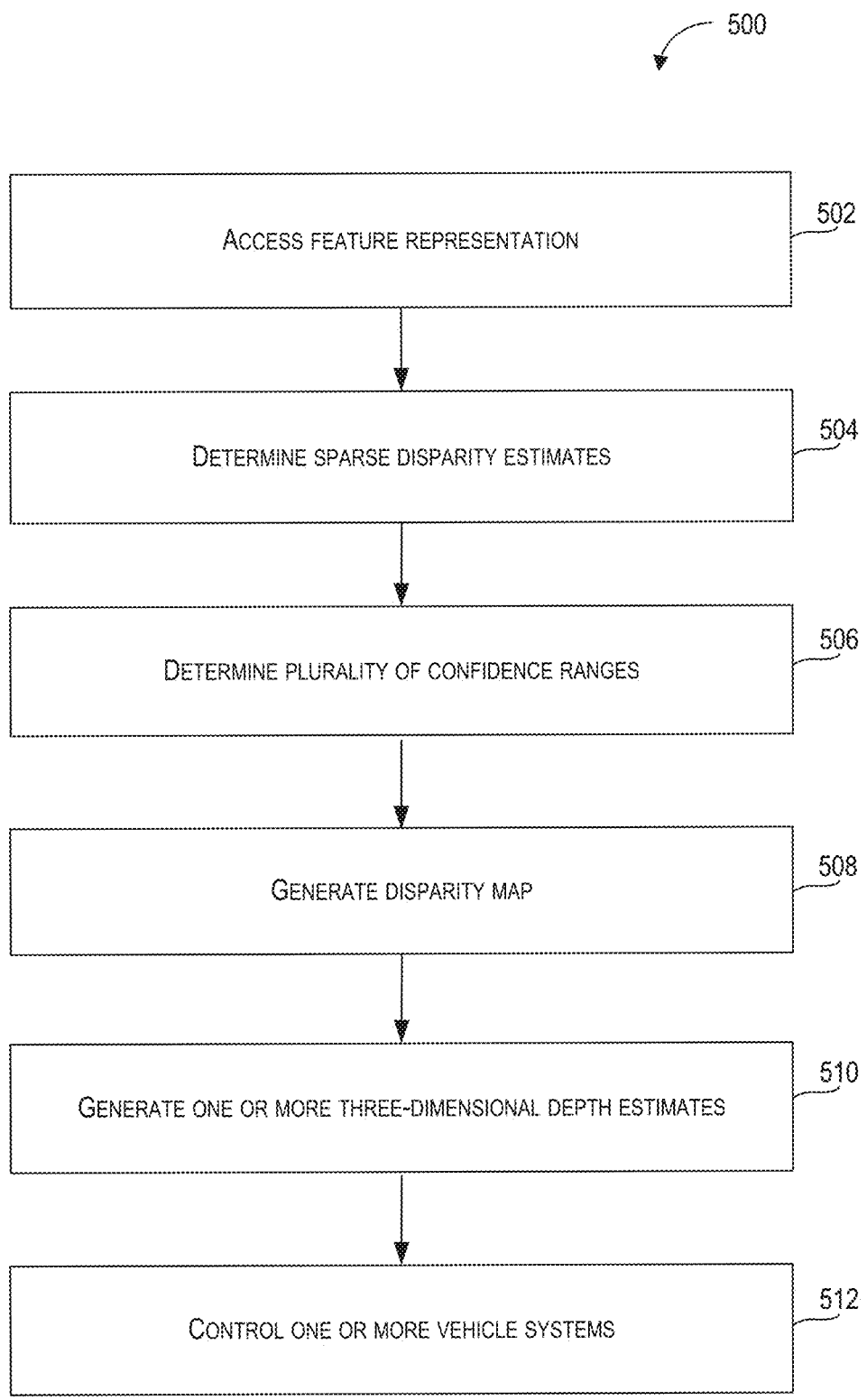
FIG. 5 depicts a flow diagram of an example method of stereo depth estimation according to example embodiments of the present disclosure.

FIG. 5 depicts a flow diagram of an example method of stereo depth estimation according to example embodiments of the present disclosure. One or more portions of a method 500 can be implemented by one or more devices (e.g., one or more computing devices) or systems including, for example, the operations computing system 104, the vehicle 108, or the vehicle computing system 112, shown in FIG. 1. Moreover, one or more portions of the method 500 can be implemented as an algorithm on the hardware components of the devices described herein (e.g., as in FIG. 1). FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include accessing data which can include a feature representation. The feature representation can be associated with a pair of stereo images including a first plurality of points and a second plurality of points respectively. By way of example, the vehicle computing system 112 can access data (e.g., image data stored on a memory device) including a feature representation associated with at least one pair of stereo images (e.g., stereo images encoded in a raster format that includes a plurality of points (pixels), with each point associated with information including a color, location, and/or intensity of the point). The pair of stereo images can be images of the same environment captured from different perspectives. For example, the one or more sensors 114 can include a pair of cameras mounted side by side, with one camera on the left that captures an image of the environment from the left side and the other camera on the right that captures an image of the environment from the right side.

In some embodiments, the feature representation can be associated and/or include sets of stereo images. Further, the sets of stereo images can include the first plurality of points and the second plurality of points respectively. Each of the sets of stereo images can include one or more images captured over one or more time intervals. For example, the sets of stereo images can include a first set of images captured over one or more time intervals from a first perspective; and a second set of images captured over one or more time intervals from a second perspective that is different from the first set of images and includes the same environment captured by the first set of images from a different angle.

Furthermore, in some embodiments, the feature representation can be based on and/or include one or more video streams. Each of the one or more video streams can include one or more images that were captured over one or more time intervals. For example, the first video stream can include a sequence of images captured over one or more time intervals by the video camera on the front left side of a vehicle; and the second video stream can include a sequence of images captured over one or more time intervals by a different camera from the right side of the same vehicle.

At 504, the method 500 can include determining sparse disparity estimates. The one or more sparse disparity estimates can be associated with disparities between the first plurality of points and the second plurality of points. Further, the sparse disparity estimates can be based at least in part on one or more machine-learned models configured to perform operations. The operations performed by the one or more machine-learned models can include estimating the disparities based at least in part on one or more comparisons of portions of the first plurality of points to portions of the second plurality of points. Further, the one or more comparisons of the portions of the first plurality of points to portions of the second plurality of points can include one or more comparisons over one or more time intervals.

For example, the vehicle computing system 112 can include one or more machine-learned models (e.g., one or more machine-learned models including one or more sparse disparity estimate determination models) that are configured and/or trained to receive input including the first plurality of points and the second plurality of points; perform one or operations on the input including comparing the first plurality of points to the second plurality of points over one or more time intervals; and generating an output including the sparse disparity estimates. The sparse disparity estimates generated by the one or more machine-learned models can include an estimate of the differences between the first plurality of points and the second plurality of points (e.g., different locations of the same feature in the first plurality of points and the second plurality of points).

At 506, the method 500 can include determining a plurality of confidence ranges. The plurality of confidence ranges can be based at least in part on the sparse disparity estimates and the one or more machine-learned models. Further, the plurality of confidence ranges can be associated with the disparities between the portions of the first plurality of points and the portions of the second plurality of points. The disparities between the portions of the first plurality of points and the portions of the second plurality of points can include disparities over one or more time intervals (e.g., differences from one time interval to a subsequent time interval).

For example, the one or more machine-learned models (e.g., one or more machine-learned models including one or more confidence range prediction models) of the vehicle computing system 112 be configured and/or trained to receive input including the sparse disparity estimates, the first plurality of points (e.g., the first plurality of points associated with the first image of the pair of stereo images), and/or the second plurality of points (e.g., the second plurality of points associated with the second image of the pair of stereo images). In some embodiments, one of the pair of stereo images associated with the first plurality of points or the second plurality of points can be warped. The one or more machine-learned models can then perform one or operations on the input including comparing the first plurality of points to the second plurality of points; and generating an output including the plurality of confidence ranges. The plurality of confidence ranges can be used as part of pruning out unlikely matches between the first plurality of points and the second plurality of points.

At 508, the method 500 can include generating a disparity map for the pair of stereo images. The disparity map can be based at least in part on the plurality of confidence ranges and/or the one or more machine-learned models. Further, the disparity map can be based at least in part on using the plurality of confidence ranges and/or the one or more machine-learned models to prune the disparities that are outside of the plurality of confidence ranges. In some embodiments, the disparity map can include depth information for the disparity between each point in the first plurality of points and the corresponding point in the second plurality of points over one or more time intervals.

For example, the one or more machine-learned models (e.g., one or more machine-learned models including one or more disparity map generation models) of the vehicle computing system 112 be configured and/or trained to receive input including the plurality of confidence ranges, the first plurality of points (e.g., the first plurality of points associated with the first image of the pair of stereo images), and/or the second plurality of points (e.g., the second plurality of points associated with the second image of the pair of stereo images). The one or more machine-learned models can then perform one or more operations on the input including using the plurality of confidence ranges to constrain determination of disparities between the first plurality of points to the second plurality of points; and generating an output including the disparity map, which can include depth information associated with the disparity between each point in the first plurality of points and the corresponding point in the second plurality of points.

At 510, the method 500 can include generating one or more three-dimensional depth estimates associated with the pair of stereo images. The one or more three-dimensional depth estimates can be based at least in part on the disparity map. The disparity map can be used to generate three-dimensional estimates associated with the physical location of each portion of the environment depicted by each point in the disparity map. For example, the vehicle computing system 112 can use the disparity map to generate a three-dimensional representation of an environment captured by the one or more sensors 114 (e.g., a pair of stereo images captured by a pair of cameras of the vehicle 108). The one or more three-dimensional depth estimates can be used to determine the location and/or position of one or more objects depicted in the pair of stereo images. The vehicle computing system 112 can then use the one or more three-dimensional depth estimates as an input to a perception system of the vehicle 108, that can be used to determine the state of the environment surrounding the vehicle 108.

In some embodiments, the disparity map can be used to generate three-dimensional estimates associated with the physical location of each portion of the environment depicted by each point in the disparity map at a particular time interval. Further, the one or more three-dimensional depth estimates can be respectively generated for one or more time intervals.

At 512, the method 500 can include controlling one or more vehicle systems of the autonomous vehicle based at least in part on the one or more three-dimensional depth estimates. The one or more vehicle systems of the autonomous vehicle can include one or more engine systems, one or more motor systems, one or more steering systems, one or more braking systems, one or more safety systems, and/or one or more communications systems. By way of example, the vehicle computing system 112 can use the one or more three-dimensional depth estimates to determine the position of one or more objects depicted in the pair of stereo images (e.g., a pair of stereo images based at least in part on capturing images of the environment surrounding the vehicle 108). The vehicle computing system 112 can then control engine systems and braking systems of the vehicle 108 to maneuver and control the vehicle 108 so that it can safely traverse the environment depicted in the pair of stereo images.

Figure 6:
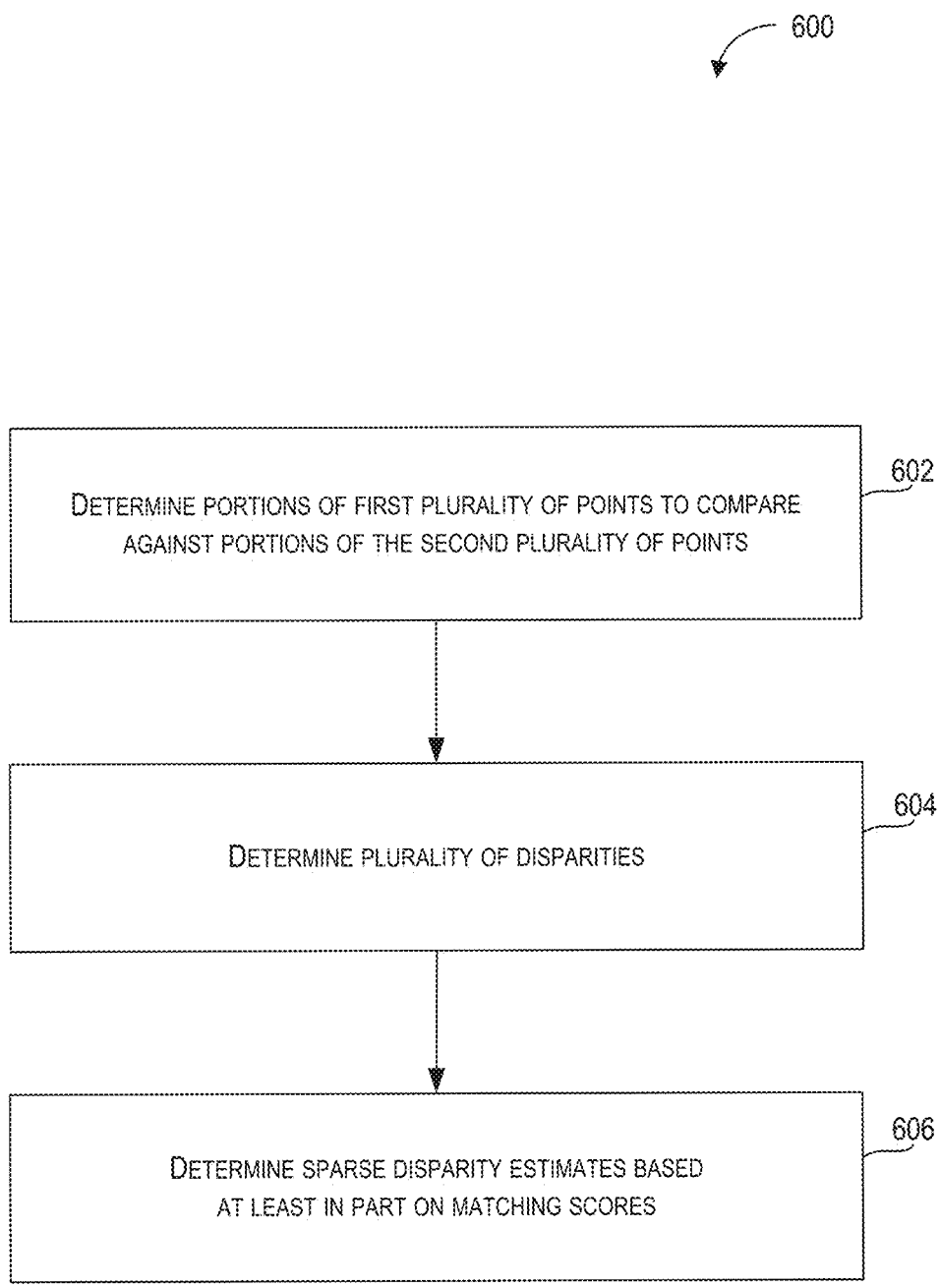
FIG. 6 depicts a flow diagram of an example method of sparse disparity estimation according to example embodiments of the present disclosure.

FIG. 6 depicts a flow diagram of an example method of sparse disparity estimation according to example embodiments of the present disclosure. One or more portions of a method 600 can be implemented by one or more devices (e.g., one or more computing devices) or systems including, for example, the operations computing system 104, the vehicle 108, or the vehicle computing system 112, shown in FIG. 1. Moreover, one or more portions of the method 600 can be implemented as an algorithm on the hardware components of the devices described herein (e.g., as in FIG. 1). In some embodiments, one or more portions of the method 600 can be performed as part of the method 500 that is depicted in FIG. 5. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include determining and/or selecting the portions of the first plurality of points to compare against the portions of the second plurality of points. The portions of the first plurality of points to compare against the portions of the second plurality of points can be based at least in part on a random sampling of the first plurality of points. Further, the locations of the portions of the second plurality of points can correspond to and/or be associated with locations of the portions of the first plurality of points.

For example, the vehicle computing system 112 can use one or more machine-learned models to determine portions of the first plurality of points and the second plurality of points to compare against one another. The one or more machine-learned models can be configured and/or trained to receive an input including the first plurality of points and the second plurality of points; perform one or more operations including sampling different portions of the first plurality of points and the second plurality of points; and generating an output including candidate portions of the first plurality of points and the second plurality of points that will be compared.

At 604, the method 600 can include determining a plurality of disparities between the portions of the first plurality of points and the portions of the second plurality of points. The plurality of disparities can be based at least in part on the one or more comparisons of the portions of the first plurality of points to the portions of the second plurality of points. The portions of the first plurality of points and the portions of the second plurality of points can include the portions that were determined or selected in 602 (e.g., the candidate portions of the first plurality of points and the second plurality of points).

For example, the vehicle computing system 112 can use one or more machine-learned models to determine a plurality of disparities between the portions of the first plurality of points and the second plurality of points. The one or more machine-learned models can be configured and/or trained to receive an input including the portions of the first plurality of points and the second plurality of points; perform one or more operations including comparing the different portions of the first plurality of points and the second plurality of points; and generating an output including a plurality of disparities between the first plurality of points and the second plurality of points.

At 606, the method 600 can include determining the sparse disparity estimates based at least in part on matching scores associated with the plurality of disparities between the portions of the first plurality of points and the portions of the second plurality of points.

For example, the vehicle computing system 112 can use one or more machine-learned models to determine the sparse disparity estimates based at least in part on matching scores associated with the plurality of disparities between the portions of the first plurality of points and the portions of the second plurality of points. The one or more machine-learned models can be configured and/or trained to receive an input including the portions of the first plurality of points, the second plurality of points, and the respective plurality of disparities; perform one or more operations including comparing disparities for different portions of the first plurality of points and corresponding portions of the second plurality of points; and generating an output including matching scores for each point of the first plurality of points and the second plurality of points. The matching scores can correspond to or be associated with the amount of disparity between each point of the first plurality of points and the second plurality of points (e.g., a higher score can be positively correlated with a greater disparity).

Figure 7:
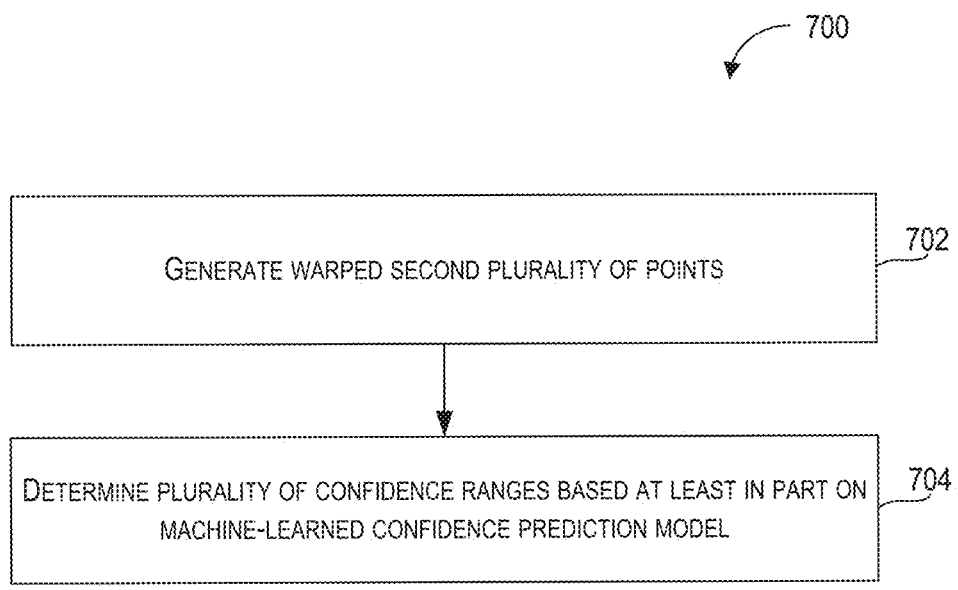
FIG. 7 depicts a flow diagram of an example method of determining confidence ranges according to example embodiments of the present disclosure.

FIG. 7 depicts a flow diagram of an example method of determining confidence ranges according to example embodiments of the present disclosure. One or more portions of a method 700 can be implemented by one or more devices (e.g., one or more computing devices) or systems including, for example, the operations computing system 104, the vehicle 108, or the vehicle computing system 112, shown in FIG. 1. Moreover, one or more portions of the method 700 can be implemented as an algorithm on the hardware components of the devices described herein (e.g., as in FIG. 1). In some embodiments, one or more portions of the method 700 can be performed as part of the method 500 that is depicted in FIG. 5. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include generating a warped second plurality of points. The warped second plurality of points can be based at least in part on the sparse disparity estimates and/or the second plurality of points. For example, the vehicle computing system 112 can use the sparse disparity estimates to warp the second plurality of points so that the second plurality of points is more similar to the first plurality of points. Warping the second plurality of points can include adjusting the proportions of the second plurality of points to more closely match the proportions of the first plurality of points.

At 704, the method 700 can include determining the plurality of confidence ranges. The plurality of confidence ranges can be based at least in part on the one or more machine-learned models including a machine-learned confidence prediction model. The machine-learned confidence prediction model can be configured and/or trained to receive an input that includes the first plurality of points, the warped second plurality of points, and/or the sparse disparity estimates; perform one or more operations on the input, the one or more operations including comparing the first plurality of points to the warped second plurality of points; and generate an output including the plurality of confidence ranges.

Figure 8:
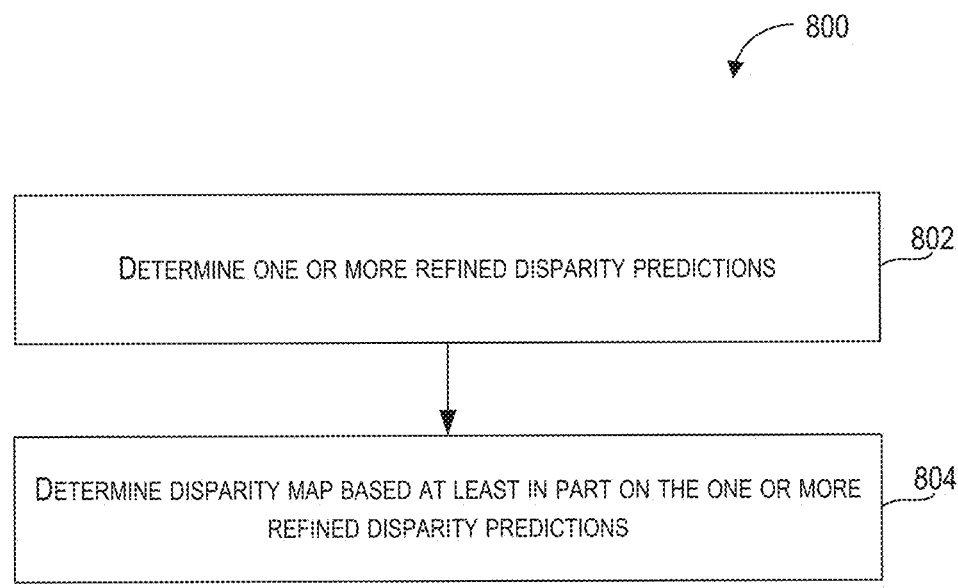
FIG. 8 depicts a flow diagram of an example method of generating a disparity map according to example embodiments of the present disclosure.

FIG. 8 depicts a flow diagram of an example method of generating a disparity map according to example embodiments of the present disclosure. One or more portions of a method 800 can be implemented by one or more devices (e.g., one or more computing devices) or systems including, for example, the operations computing system 104, the vehicle 108, or the vehicle computing system 112, shown in FIG. 1. Moreover, one or more portions of the method 800 can be implemented as an algorithm on the hardware components of the devices described herein (e.g., as in FIG. 1). In some embodiments, one or more portions of the method 800 can be performed as part of the method 500 that is depicted in FIG. 5. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include determining one or more refined disparity predictions based at least in part on the sparse disparity estimates, the first plurality of points, and/or the one or more machine-learned models. The one or more machine-learned models can include a machine-learned refinement model that is configured and/or trained to analyze low-level features of the feature representation. For example, the vehicle computing system can include one or more machine-learned models that are configured and/or trained to receive an input including the sparse disparity estimates, the first plurality of points, and/or the second plurality of points; perform one or more operations including analyzing the features of the input including small or fine features associated with edges between objects; and generate an output including one or more refined disparity predictions.

At 804, the method 800 can include generating the disparity map based at least in part on the one or more refined disparity predictions. For example, the vehicle computing system 112 can use the one or more refined disparity predictions to refine the disparity map (e.g., generate a more accurate disparity map). A more refined disparity map can more accurately describe the disparity between the first plurality of points and the second plurality of points, including the disparity in portions of the first plurality of points and the second plurality of points that are associated with smaller or finer features of the feature representation.

Figure 9:
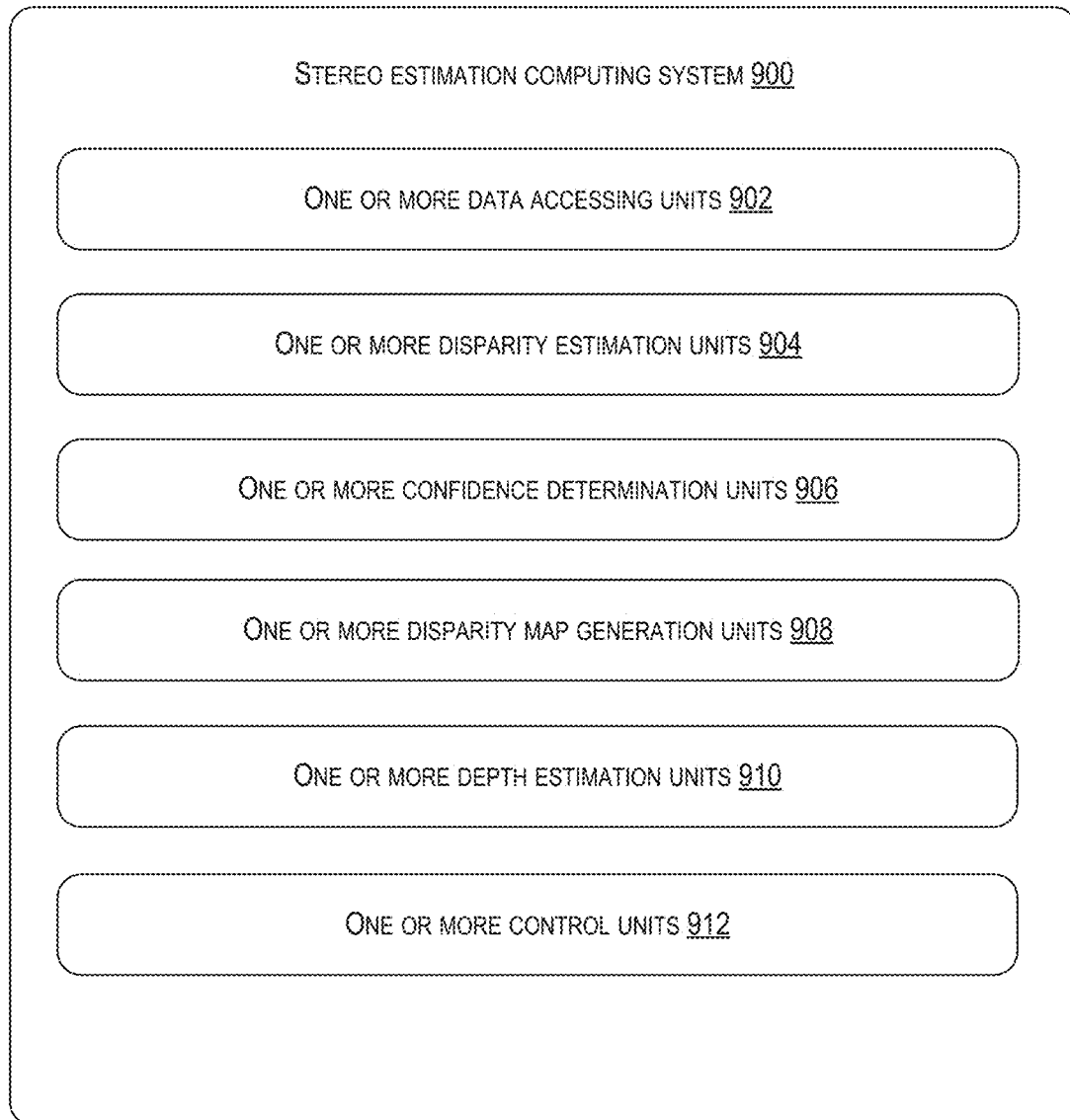
FIG. 9 depicts a diagram of an example system according to example embodiments of the present disclosure.

FIG. 9 depicts a diagram of an example system according to example embodiments of the present disclosure. One or more operations and/or functions in FIG. 9 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 9 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a depth estimation computing system 900 can include one or more data accessing units 902, one or more disparity estimation units 904, one or more confidence determination units 906, one or more disparity map generation units 908, one or more depth estimation units 910, one or more control units 912, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a depth estimation computing system) or configured (e.g., an ASIC custom designed and configured to operate a depth estimation computing system) to perform one or more algorithms for performing the operations and functions described herein. For example, the means (e.g., the one or more data accessing units 902) can be configured to access a feature representation associated with a pair of stereo images including a first plurality of points and a second plurality of points respectively.

The means (e.g., the one or more disparity estimation units 904) can be configured to determine sparse disparity estimates associated with disparities between the first plurality of points and the second plurality of points. The sparse disparity estimates can be based at least in part on one or more machine-learned models configured to perform operations including estimating the disparities based at least in part on one or more comparisons of portions of the first plurality of points to portions of the second plurality of points.

In some embodiments, the one or more disparity estimation units 904 can be configured to determine, based at least in part on a random sampling of the first plurality of points, the portions of the first plurality of points to compare against the portions of the second plurality of points. Locations of the portions of the second plurality of points can correspond to locations of the portions of the first plurality of points.

In some embodiments, the one or more disparity estimation units 904 can be configured to determine a plurality of disparities between the portions of the first plurality of points and the portions of the second plurality of points based at least in part on the one or more comparisons of the portions of the first plurality of points to the portions of the second plurality of points.

In some embodiments, the one or more disparity estimation units 904 can be configured to determine the sparse disparity estimates based at least in part on matching scores associated with the plurality of disparities between the portions of the first plurality of points and the portions of the second plurality of points.

The means (e.g., the one or more confidence determination units 906) can be configured to determine, based at least in part on the sparse disparity estimates and the one or more machine-learned models, a plurality of confidence ranges associated with the disparities between the portions of the first plurality of points and the portions of the second plurality of points.

In some embodiments, the one or more confidence determination units 906 can be configured to generate a warped second plurality of points based at least in part on the sparse disparity estimates and the second plurality of points.

In some embodiments, the one or more confidence determination units 906 can be configured to determine the plurality of confidence ranges based at least in part on the one or more machine-learned models that can include a machine-learned confidence prediction model configured to determine the plurality of confidence ranges based at least in part on an input including the first plurality of points, the warped plurality of points, and the sparse disparity estimates.

The means (e.g., the one or more disparity map generation units 908) can be configured to generate a disparity map for the pair of stereo images based at least in part on using the plurality of confidence ranges and the one or more machine-learned models to prune the disparities that are outside of the plurality of confidence ranges.

In some embodiments, the one or more confidence determination units 908 can be configured to determine one or more refined disparity predictions based at least in part on the sparse disparity estimates, the first plurality of points, and the one or more machine-learned models that can include a machine-learned refinement model configured to analyze low-level features of the feature representation.

In some embodiments, the one or more confidence determination units 908 can be configured to generate the disparity map based at least in part on the one or more refined disparity predictions.

The means (e.g., the one or more depth estimation units 910) can be configured to generate, based at least in part on the disparity map, one or more three-dimensional depth estimates associated with the pair of stereo images.

The means (e.g., the one or more control units 912) can be configured to control one or more vehicle systems of an autonomous vehicle based at least in part on the one or more three-dimensional depth estimates.

Figure 10:
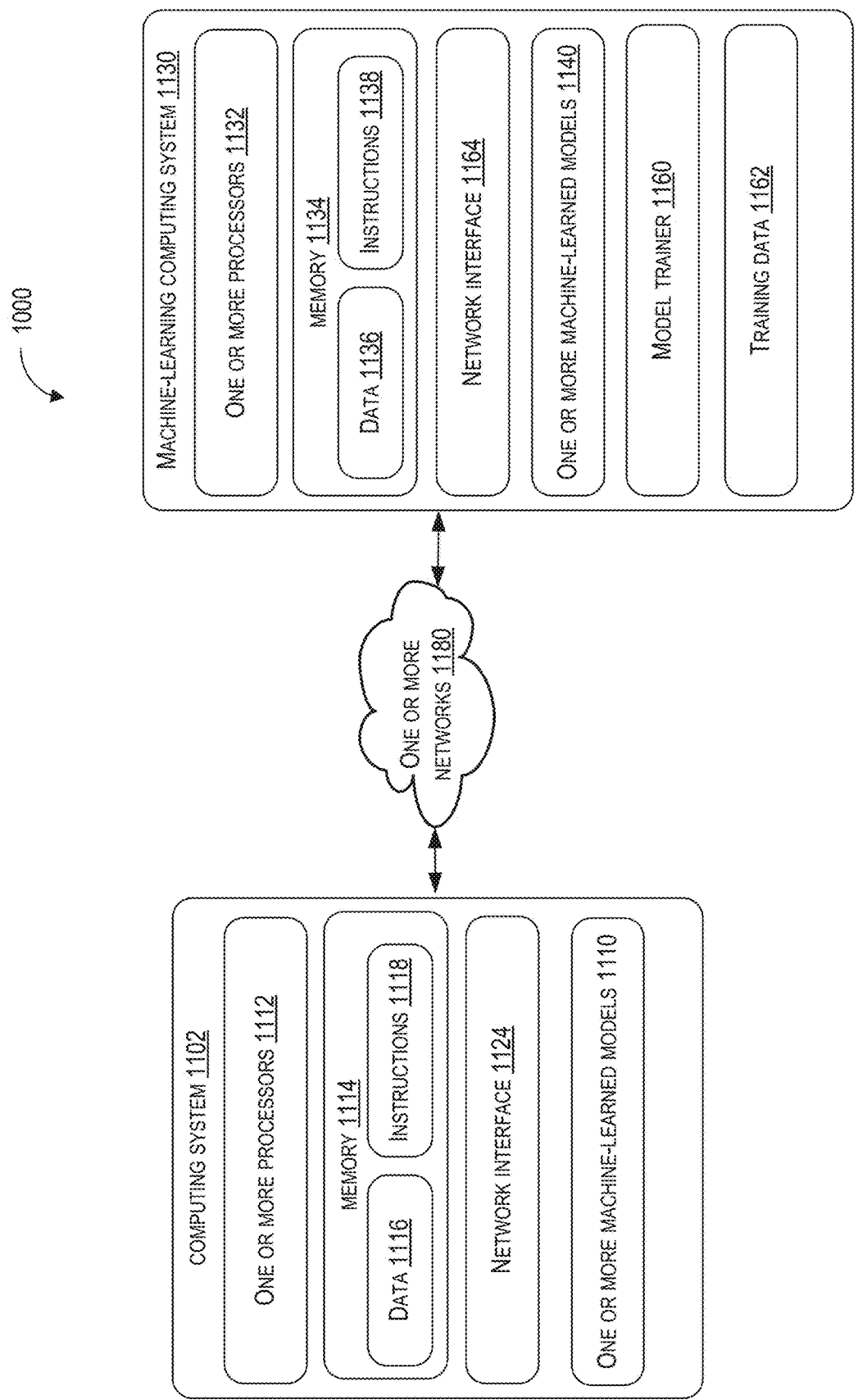
FIG. 10 depicts a diagram of an example system according to example embodiments of the present disclosure.

FIG. 10 depicts a block diagram of an example computing system 1000 according to example embodiments of the present disclosure. The example system 1000 includes a computing system 1102 and a machine learning computing system 1130 that are communicatively coupled over network(s) 1180.

In some implementations, the computing system 1102 can perform operations associated with the generation of three-dimensional depth estimates based at least in part on accessing a feature representation that includes a pair of stereo images. In some implementations, the computing system 1102 can be included in an autonomous vehicle. For example, the computing system 1102 can be on-board the autonomous vehicle. In other implementations, the computing system 1102 is not located on-board the autonomous vehicle. For example, the computing system 1102 can operate offline to generate three-dimensional depth estimates based at least in part on accessing a feature representation that includes a pair of stereo images. The computing system 1102 can include one or more distinct physical computing devices.

The computing system 1102 includes one or more processors 1112 and a memory 1114. The one or more processors 1112 can be any suitable processing device (e.g., a processor core, a microprocessor, an ASIC, a FPGA, a controller, a microcontroller, etc.) and can be one processor or a plurality of processors that are operatively connected. The memory 1114 can include one or more non-transitory computer-readable storage media, such as RAM, ROM, EEPROM, EPROM, one or more memory devices, flash memory devices, etc., and combinations thereof.

The memory 1114 can store information that can be accessed by the one or more processors 1112. For instance, the memory 1114 (e.g., one or more non-transitory computer-readable storage mediums, memory devices) can store data 1116 that can be obtained, received, accessed, written, manipulated, created, and/or stored. The data 1116 can include, for instance, any of the data and/or information described herein including information associated with the pair of stereo images; the feature representation associated with the pair of stereo images; the sparse disparity estimates; the plurality of confidence ranges; the disparity map; the one or more three-dimensional depth estimates; and/or the one or more machine-learned models. In some implementations, the computing system 1102 can obtain data from one or more memory devices that are remote from the system 1102.

The memory 1114 can also store computer-readable instructions 1118 that can be executed by the one or more processors 1112. The instructions 1118 can be software written in any suitable programming language or can be implemented in hardware. Additionally, or alternatively, the instructions 1118 can be executed in logically and/or virtually separate threads on one or more processors 1112.

For example, the memory 1114 can store instructions 1118 that when executed by the one or more processors 1112 cause the one or more processors 1112 to perform any of the operations and/or functions described herein, including, for example, accessing a feature representation associated with a pair of stereo images including a first plurality of points and a second plurality of points respectively; determining sparse disparity estimates associated with disparities between the first plurality of points and the second plurality of points; determining, based at least in part on the sparse disparity estimates and the one or more machine-learned models, a plurality of confidence ranges associated with the disparities between the portions of the first plurality of points and the portions of the second plurality of points; generating a disparity map for the pair of stereo images based at least in part on using the plurality of confidence ranges and the one or more machine-learned models to prune the disparities that are outside of the plurality of confidence ranges; and generating, based at least in part on the disparity map, one or more three-dimensional depth estimates associated with the pair of stereo images.

According to an aspect of the present disclosure, the computing system 1102 can store or include one or more machine-learned models 1110. As examples, the one or more machine-learned models 1110 can be or can otherwise include various machine-learned models such as, for example, neural networks (e.g., deep neural networks), support vector machines, decision trees, ensemble models, k-nearest neighbors models, Bayesian networks, encoder-decoder models, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1102 can receive the one or more machine-learned models 1110 from the machine learning computing system 1130 over network 1180 and can store the one or more machine-learned models 1110 in the memory 1114. The computing system 1102 can then use or otherwise implement the one or more machine-learned models 1110 (e.g., by the one or more processors 1112). In particular, the computing system 1102 can implement the one or more machine learned models 1110 to perform any of the operations described herein including accessing a feature representation associated with a pair of stereo images including a first plurality of points and a second plurality of points respectively; determining sparse disparity estimates associated with disparities between the first plurality of points and the second plurality of points; determining, based at least in part on the sparse disparity estimates and the one or more machine-learned models, a plurality of confidence ranges associated with the disparities between the portions of the first plurality of points and the portions of the second plurality of points; generating a disparity map for the pair of stereo images based at least in part on using the plurality of confidence ranges and the one or more machine-learned models to prune the disparities that are outside of the plurality of confidence ranges; and generating, based at least in part on the disparity map, one or more three-dimensional depth estimates associated with the pair of stereo images.

The machine learning computing system 1130 includes one or more processors 1132 and a memory 1134. The one or more processors 1132 can be any suitable processing device (e.g., a processor core, a microprocessor, an ASIC, a FPGA, a controller, a microcontroller, etc.) and can be one processor or a plurality of processors that are operatively connected. The memory 1134 can include one or more non-transitory computer-readable storage media, such as RAM, ROM, EEPROM, EPROM, one or more memory devices, flash memory devices, etc., and combinations thereof.

The memory 1134 can store information that can be accessed by the one or more processors 1132. For instance, the memory 1134 (e.g., one or more non-transitory computer-readable storage mediums, memory devices) can store data 1136 that can be obtained, received, accessed, written, manipulated, created, and/or stored. The data 1136 can include, for instance, any of the data and/or information described herein including information associated with the pair of stereo images; the feature representation associated with the pair of stereo images; the sparse disparity estimates; the plurality of confidence ranges; the disparity map; the one or more three-dimensional depth estimates; and/or the one or more machine-learned models. In some implementations, the machine learning computing system 1130 can obtain data from one or more memory devices that are remote from the system 1130.

The memory 1134 can also store computer-readable instructions 1138 that can be executed by the one or more processors 1132. The instructions 1138 can be software written in any suitable programming language or can be implemented in hardware. Additionally, or alternatively, the instructions 1138 can be executed in logically and/or virtually separate threads on one or more processors 1132.

For example, the memory 1134 can store instructions 1138 that when executed by the one or more processors 1132 cause the one or more processors 1132 to perform any of the operations and/or functions described herein, including, for example, perform any of the operations described herein including accessing a feature representation associated with a pair of stereo images including a first plurality of points and a second plurality of points respectively; determining sparse disparity estimates associated with disparities between the first plurality of points and the second plurality of points; determining, based at least in part on the sparse disparity estimates and the one or more machine-learned models, a plurality of confidence ranges associated with the disparities between the portions of the first plurality of points and the portions of the second plurality of points; generating a disparity map for the pair of stereo images based at least in part on using the plurality of confidence ranges and the one or more machine-learned models to prune the disparities that are outside of the plurality of confidence ranges; and generating, based at least in part on the disparity map, one or more three-dimensional depth estimates associated with the pair of stereo images.

In some implementations, the machine learning computing system 1130 includes one or more server computing devices. If the machine learning computing system 1130 includes multiple server computing devices, such server computing devices can operate according to various computing architectures, including, for example, sequential computing architectures, parallel computing architectures, or some combination thereof.

In addition to or alternatively, the one or more machine-learned models 1110 at the computing system 1102, the machine learning computing system 1130 can include one or more machine-learned models 1140. As examples, the one or more machine-learned models 1140 can be or can otherwise include various machine-learned models such as, for example, neural networks (e.g., deep neural networks), support vector machines, decision trees, ensemble models, k-nearest neighbors models, Bayesian networks, encoder-decoder models, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1130 can communicate with the computing system 1102 according to a client-server relationship. For example, the machine learning computing system 1140 can implement the one or more machine-learned models 1140 to provide a web service to the computing system 1102. For example, the web service can provide information associated with sparse disparity estimates, disparity maps, and/or one or more three-dimensional depth estimates that are based on inputs including a pair of stereo images.

Thus, the one or more machine-learned models 1110 can located and used at the computing system 1102 and/or one or more machine-learned models 1140 can be located and used at the machine learning computing system 1130.

In some implementations, the machine learning computing system 1130 and/or the computing system 1102 can train the machine-learned models 1110 and/or 1140 through use of a model trainer 1160. The model trainer 1160 can train the one or more machine-learned models 1110 and/or the one or more machine-learned models 1140 using one or more training or learning algorithms. One example training technique is backwards propagation of errors. In some implementations, the model trainer 1160 can perform supervised training techniques using a set of labeled training data. In other implementations, the model trainer 1160 can perform unsupervised training techniques using a set of unlabeled training data. The model trainer 1160 can perform a number of generalization techniques to improve the generalization capability of the models being trained. Generalization techniques include weight decays, dropouts, or other techniques.

In particular, the model trainer 1160 can train one or more machine-learned models 1110 and/or one or more machine-learned models 1140 based on a set of training data 1162.

The training data 1162 can include, for example, any of the data and/or information described herein including information associated with the pair of stereo images; the feature representation associated with the pair of stereo images; the sparse disparity estimates; the plurality of confidence ranges; the disparity map; and/or the one or more three-dimensional depth estimates. Further, the training data 1162 can include training datasets which can include synthetic datasets that can include dense ground-truth disparity maps and testing pairs of stereo images of predetermined dimensions. Further, the training data 1162 can include real world datasets including a plurality of training pairs of stereo images, a plurality of testing pairs of stereo images. The ground-truth disparity maps associated with the real world datasets can be based at least in part on LiDAR points associated with the respective pairs of stereo images. The model trainer 1160 can be implemented in hardware, firmware, and/or software controlling one or more processors.

Furthermore, the one or more machine-learned models 1110 and/or the one or more machine-learned models 1140 can be end-to-end differentiable. Further, training the one or more machine-learned models 1110 and/or the one or more machine-learned models 1140 can include the use of back-propagation to learn parameters. In some embodiments, given a ground truth disparity y, a total loss function can be defined as: $(y_{cost}-y_{gt})+l_s(y_{refine}-y_{gt})+\gamma\{l_{lower}(1-y_{gt})+l_{upper}(u-y_{gt})\}$, in which the total loss is based at least in part on: the difference between the cost disparity (y) and the ground-truth disparity ($y_{cost}-y_{gt}$); the smooth loss associated with the difference between the refinement disparity and the ground-truth refinement disparity ($y_{refine}-y_{gt}$); the balancing scalar $\gamma$; and/or the difference between the lower bound ($l_{lower}$) and the upper bound ($l_{upper}$) of the confidence range.

A smooth-$l_1$ loss can be applied over the disparity prediction in the cost aggregation and refinement operations respectively. The smooth loss, $l_s$ can be defined as:

$$\ell_s(x) = \begin{cases} 0.5x^2, & \text{if } |x| < 1 \\ |x| - 0.5, & \text{otherwise} \end{cases}.$$

In some embodiments, the loss over the lower bound ($l_{lower}$) and the upper bound ($l_{upper}$) of the confidence range can be defined as a boomerang shape unbalanced smooth $l_1$ loss, in which the smooth loss associated with the lower bound of the confidence range can be defined as:

$$\ell_{lower}(x) = \begin{cases} (1-\lambda)\ell_s(x) & \text{if } x > 0 \\ \ell_s(x) & \text{otherwise} \end{cases},$$

in which the regularization hyper-parameter $\lambda$ in which $0<\lambda<0.5$; and in which the smooth loss associated with the lower bound of the confidence range can be defined as:

$$\ell_{upper}(x) = \begin{cases} \lambda\ell_s(x) & \text{if } x > 0 \\ (1-\lambda)\ell_s(x) & \text{otherwise} \end{cases},$$

which can also include the regularization hyper-parameter $\lambda$ in which $0<\lambda<0.5$. The $l_{upper}$ can encourage the upper bound prediction to be closer to, but larger than, the ground truth disparity; and the $l_{lower}$ can encourage the lower-bound prediction to be closer to, but smaller than, the ground-truth disparity.

In some embodiments, the one or more machine-learned models 1110 and/or one or more machine-learned models 1140 can be trained end-to-end (e.g., trained end-to-end on randomly cropped input images). Further, color normalization can be performed on the input images. By way of example, for the training datasets, the loss function can include the regularization hyper-parameter λ with a value equal to 0.315, and the balancing scalar γ with a value equal to 2.4. Further, the loss can be determined over pixels with ground truth disparities between 0 and 192. Evaluation of the loss function can be conducted over all pixels regardless of their respective disparity values.

The computing system 1102 can also include a network interface 1124 used to communicate with one or more systems or devices, including systems or devices that are remotely located from the computing system 1102. The network interface 1124 can include any circuits, components, software, etc. for communicating with one or more networks (e.g., 1180). In some implementations, the network interface 1124 can include, for example, one or more of a communications controller, receiver, transceiver, transmitter, port, conductors, software and/or hardware for communicating data. Similarly, the machine learning computing system 1130 can include a network interface 1164.

The one or more networks 1180 can be any type of network or combination of networks that allows for communication between devices. In some embodiments, the one or more networks can include one or more of a local area network, wide area network, the Internet, secure network, cellular network, mesh network, peer-to-peer communication link and/or some combination thereof and can include any number of wired or wireless links. Communication over the one or more networks 1180 can be accomplished, for instance, via a network interface using any type of protocol, protection scheme, encoding, format, packaging, etc.

FIG. 10 illustrates one example computing system 1000 that can be used to implement the present disclosure. Other computing systems can be used as well. For example, in some implementations, the computing system 1102 can include the model trainer 1160 and the training dataset 1162. In such implementations, the one or more machine-learned models 1110 can be both trained and used locally at the computing system 1102. As another example, in some implementations, the computing system 1102 is not connected to other computing systems.

In addition, components illustrated and/or discussed as being included in one of the computing systems 1102 or the computing systems 1130 can instead be included in another of the computing systems 1102 or the computing systems 1130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to computing devices, databases, software applications, and other computer-based systems, as well as actions taken and information sent to and/or from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Data and/or instructions can be implemented on a single system or distributed across multiple systems. Distributed components can operate sequentially or in parallel.

Furthermore, computing tasks discussed herein as being performed at computing devices remote from the vehicle can instead be performed at the vehicle (e.g., via the vehicle computing system). Such configurations can be implemented without deviating from the scope of the present disclosure. The use of computer-based systems allows for a great variety of different possible configurations, combinations, and/or divisions of tasks and functionality between and/or among components. Computer-implemented tasks and/or operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of depth estimation, the computer-implemented method comprising:
   accessing, by a computing system comprising one or more computing devices, a feature representation associated with a pair of stereo images comprising a first plurality of points and a second plurality of points respectively;
   determining, by the computing system, sparse disparity estimates associated with disparities between the first plurality of points and the second plurality of points, wherein the sparse disparity estimates are based at least in part on one or more machine-learned models configured to perform operations comprising estimating the disparities based at least in part on one or more comparisons of portions of the first plurality of points to portions of the second plurality of points;
   determining, by the computing system, based at least in part on the sparse disparity estimates and the one or more machine-learned models, a plurality of confidence ranges associated with the disparities between the portions of the first plurality of points and the portions of the second plurality of points;
   generating, by the computing system, a disparity map for the pair of stereo images based at least in part on using the plurality of confidence ranges and the one or more machine-learned models to prune the disparities that are outside of the plurality of confidence ranges; and
   generating, by the computing system, based at least in part on the disparity map, one or more three-dimensional depth estimates associated with the pair of stereo images.

2. The computer-implemented method of claim 1, wherein the determining, by the computing system, sparse disparity estimates associated with disparities between the first plurality of points and the second plurality of points of the pair of stereo images comprises:

determining, by the computing system, based at least in part on a random sampling of the first plurality of points, the portions of the first plurality of points to compare against the portions of the second plurality of points, wherein locations of the portions of the second plurality of points correspond to locations of the portions of the first plurality of points;

determining, by the computing system, a plurality of disparities between the portions of the first plurality of points and the portions of the second plurality of points based at least in part on the one or more comparisons of the portions of the first plurality of points to the portions of the second plurality of points; and determining, by the computing system, the sparse disparity estimates based at least in part on matching scores associated with the plurality of disparities between the portions of the first plurality of points and the portions of the second plurality of points.

3. The computer-implemented method of claim 1, wherein the random sampling of the first plurality of points comprises a random sampling of a uniform distribution of the first plurality of points.

4. The computer-implemented method of claim 1, wherein at least one of the one or more machine-learned models comprises a plurality of layers configured to perform the operations comprising the one or more comparisons of the portions of the first plurality of points and the portions of the second plurality of points, and wherein the plurality of layers comprises a sampling layer, a propagation layer, and an evaluation layer.

5. The computer-implemented method of claim 1, wherein the one or more comparisons of the portions of the first plurality of points to the portions of the second plurality of points comprise use of a one-hot filter pattern on the portions of the first plurality of points and the portions of the second plurality of points.

6. The computer-implemented method of claim 1, wherein the sparse disparity estimates are determined over a plurality of iterations.

7. The computer-implemented method of claim 6, wherein each of the plurality of iterations comprises one or more disparity operations associated with determination of the portions of the first plurality of points that have minimal disparity with respect to the portions of the second plurality of points.

8. The computer-implemented method of claim 1, wherein the one or more machine-learned models are trained based at least in part on minimization of a loss associated with one or more differences between a training disparity map and a ground-truth disparity map, wherein the training disparity map is generated based at least in part on training data and the one or more machine-learned models, and wherein the training data comprises a plurality of training feature representations respectively associated with a plurality of pairs of training stereo images.

9. The computer-implemented method of claim 8, wherein the loss is based at least in part on a loss function associated with a cost aggregated disparity loss or a refined disparity loss.

10. The computer-implemented method of claim 8, wherein the loss is positively correlated with one or more disparities between the training disparity map and the ground-truth disparity map.

11. The computer-implemented method of claim 1, wherein the determining, by the computing system, based at least in part on the sparse disparity estimates and the one or more machine-learned models, a plurality of confidence ranges associated with the disparities between the portions of the first plurality of points and the second plurality of points comprises:

generating, by the computing system, a warped second plurality of points based at least in part on the sparse disparity estimates and the second plurality of points; and determining, by the computing system, the plurality of confidence ranges based at least in part on the one or more machine-learned models comprising a machine-learned confidence prediction model configured to determine the plurality of confidence ranges based at least in part on an input comprising the first plurality of points, the warped plurality of points, and the sparse disparity estimates.

12. The computer-implemented method of claim 1, wherein the generating, by the computing system, a disparity map for the pair of stereo images based at least in part on using the plurality of confidence ranges and the one or more machine-learned models to prune the disparities that are outside of the plurality of confidence ranges comprises:

determining, by the computing system, one or more refined disparity predictions based at least in part on the sparse disparity estimates, the first plurality of points, and the one or more machine-learned models comprising a machine-learned refinement model configured to analyze low-level features of the feature representation; and generating, by the computing system, the disparity map based at least in part on the one or more refined disparity predictions.

13. The computer-implemented method of claim 1, wherein the pair of stereo images is rectified and comprises overlapping fields of view of an environment.

14. The computer-implemented method of claim 1, wherein the first plurality of points and the second plurality of points correspond to a first plurality of pixels and a second plurality of pixels respectively.

15. A computing system comprising:

one or more processors;

a memory comprising one or more tangible non-transitory computer-readable media, the memory storing computer-readable instructions that when executed by the one or more processors cause the computing system to perform operations comprising:

accessing a feature representation associated with a pair of stereo images comprising a first plurality of points and a second plurality of points respectively;

determining sparse disparity estimates associated with disparities between the first plurality of points and the second plurality of points, wherein the sparse disparity estimates are based at least in part on one or more machine-learned models configured to perform operations comprising estimating the disparities based at least in part on one or more comparisons of portions of the first plurality of points to portions of the second plurality of points;

determining, based at least in part on the sparse disparity estimates and the one or more machine-learned models, a plurality of confidence ranges associated with the disparities between the portions of the first plurality of points and the portions of the second plurality of points;

generating a disparity map for the pair of stereo images based at least in part on using the plurality of confidence ranges and the one or more machine-learned models to prune the disparities that are outside of the plurality of confidence ranges; and generating, based at least in part on the disparity map, one or more three-dimensional depth estimates associated with the pair of stereo images.

16. The computing system of claim 15, wherein the one or more machine-learned models comprise at least one end-to-end differentiable machine-learned model.

17. The computing system of claim 15, wherein each of the plurality of confidence ranges comprises confidence values associated with one or more disparities between the portions of the first plurality of points and the portions of the second plurality of points.

18. An autonomous vehicle comprising:
one or more processors;
a memory comprising one or more tangible non-transitory computer-readable media, the memory storing computer-readable instructions that when executed by the one or more processors cause a computing system to perform operations comprising:
accessing a feature representation associated with a pair of stereo images comprising a first plurality of points and a second plurality of points respectively;
determining sparse disparity estimates associated with disparities between the first plurality of points and the second plurality of points, wherein the sparse disparity estimates are based at least in part on one or more machine-learned models configured to perform operations comprising estimating the disparities based at least in part on one or more comparisons of portions of the first plurality of points to portions of the second plurality of points;
determining, based at least in part on the sparse disparity estimates and the one or more machine-learned models, a plurality of confidence ranges associated with the disparities between the portions of the first plurality of points and the portions of the second plurality of points;
generating a disparity map for the pair of stereo images based at least in part on using the plurality of confidence ranges and the one or more machine-learned models to prune the disparities that are outside of the plurality of confidence ranges; and
generating, based at least in part on the disparity map, one or more three-dimensional depth estimates associated with the pair of stereo images.

19. The autonomous vehicle of claim 18, wherein the one or more three-dimensional depth estimates are used as part of an input to a perception system of the autonomous vehicle.

20. The autonomous vehicle of claim 18, further comprising:
controlling one or more vehicle systems of the autonomous vehicle based at least in part on the one or more three-dimensional depth estimates.

* * * * *